United States Patent
Yang et al.

(10) Patent No.: US 10,028,242 B2
(45) Date of Patent: Jul. 17, 2018

(54) TRANSMISSION METHOD AND ACCESS POINT APPLIED TO A COOPERATIVE TRANSMISSION

(71) Applicant: Huawei Technologies Co., Ltd., Shenzhen (CN)

(72) Inventors: Xun Yang, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 108 days.

(21) Appl. No.: 15/134,062

(22) Filed: Apr. 20, 2016

(65) Prior Publication Data

US 2016/0234802 A1 Aug. 11, 2016

Related U.S. Application Data

(63) Continuation of application No. PCT/CN2013/086383, filed on Oct. 31, 2013.

(51) Int. Cl.
*H04W 4/00* (2018.01)
*H04W 56/00* (2009.01)

(52) U.S. Cl.
CPC ....... *H04W 56/0035* (2013.01); *H04W 56/00* (2013.01); *H04W 56/001* (2013.01); *H04W 56/0015* (2013.01)

(58) Field of Classification Search
None
See application file for complete search history.

(56) References Cited

U.S. PATENT DOCUMENTS 5,577,071 A * 11/1996 Gehrke .................. G04G 7/00
375/238
2002/0160719 A1* 10/2002 Glazko ............. H04W 52/0206
455/67.11

(Continued)

FOREIGN PATENT DOCUMENTS

CN 101448314 A 6/2009
CN 101868941 A 10/2010

(Continued)

*Primary Examiner* — Farah Faroul
(74) *Attorney, Agent, or Firm* — Leydig Voit & Mayer, Ltd.

(57) ABSTRACT

The present disclosure provide a transmission method and a device, which relate to the technical field of communications and reduce overhead and improve work efficiency in an application of cooperative transmission in aspects of synchronization, sharing of information such as data and the like, obtaining of channel information and data transmission. Meanwhile application scenarios may also be extended. The method specifically includes: obtaining, by an access point AP, a parameter value, wherein the parameter value is a frequency difference between a crystal oscillator frequency of the AP and a reference crystal oscillator frequency of a reference AP or a delay difference of the AP with respect to the reference AP; compensating, by the AP, a phase difference or a time difference according to the parameter value when both of the AP and the reference AP send data. The present disclosure is applied to an application of a cooperative transmission.

6 Claims, 21 Drawing Sheets

(56) References Cited

U.S. PATENT DOCUMENTS

| | | | | |
|---|---|---|---|---|
| 2005/0128014 A1* | 6/2005 | Matsuura | | H01S 1/06 |
| | | | | 331/86 |
| 2007/0255855 A1* | 11/2007 | Knapp | | H04J 3/0605 |
| | | | | 709/248 |
| 2009/0135726 A1 | 5/2009 | Balan et al. | | |
| 2009/0180466 A1* | 7/2009 | Soul | | H03J 7/04 |
| | | | | 370/350 |
| 2010/0216481 A1* | 8/2010 | Gormley | | H04W 28/16 |
| | | | | 455/450 |
| 2012/0069825 A1 | 3/2012 | Ode et al. | | |
| 2013/0188597 A1* | 7/2013 | Ikeda | | H04W 36/18 |
| | | | | 370/331 |
| 2014/0003338 A1* | 1/2014 | Rahul | | H04B 7/024 |
| | | | | 370/328 |
| 2014/0213312 A1* | 7/2014 | Yeh | | H04L 27/2657 |
| | | | | 455/509 |
| 2014/0220972 A1* | 8/2014 | Appel | | H04W 56/001 |
| | | | | 455/436 |
| 2014/0369321 A1* | 12/2014 | Tan | | H04W 56/001 |
| | | | | 370/336 |
| 2015/0055496 A1 | 2/2015 | Zhao et al. | | |
| 2015/0173033 A1* | 6/2015 | Wu | | H04W 56/0015 |
| | | | | 370/328 |

FOREIGN PATENT DOCUMENTS

| | | |
|---|---|---|
| CN | 102685874 A | 9/2012 |
| CN | 102804620 A | 11/2012 |
| EP | 2264966 A1 | 12/2010 |

\* cited by examiner

TRANSMISSION METHOD AND ACCESS POINT APPLIED TO A COOPERATIVE TRANSMISSION

CROSS-REFERENCE TO RELATED APPLICATIONS

This application is a continuation of International Patent Application No. PCT/CN2013/086383, filed on Oct. 31, 2013 which is hereby incorporated by reference in its entirety.

TECHNICAL FIELD

The present disclosure relates to the technical field of communications, and in particular, to a transmission method and a device.

BACKGROUND

Multiple input multiple output (Multiple Input Multiple Output, referred to as MIMO) in a wireless communication system refers to that multidimensional space resources are built by means of multiple antennas, these multidimensional space resources form multiple parallel paths, and a wireless station may use these parallel paths to transmit multiplex signals, so as to improve a transmission rate of data. Further, since a wireless station for sending and a wireless station for receiving are different in the number of antennas, a station with more antennas may support transmitting data with multiple stations with less antennas. Generally, transmitting data from a station with more antennas to multiple stations with less antennas is called downlink multiuser MIMO (DL MU-MIMO), and transmitting data from the multiple stations with less antennas to the station with more antennas is called uplink multiuser MIMO (UL MU-MIMO).

With rapid increase of requirement for total network throughput, a network interference problem becomes a key factor hindering further improvement of network capacity. Increasing throughput by eliminating even making use of interference from perspective of multiple sending ends becomes an important trend, such as methods of cooperative transmission (cooperative transmission), coordinated beamforming (coordinated beamforming) and interference alignment (interference alignment) and the like. Further, in order to implement a cooperative transmission of multiple sending ends, a corresponding adjustment needs to be made at a transceiving end. For example, in order to support the cooperative transmission, all data must be sent with the same data at the multiple sending ends synchronously and arrive at a receiving end synchronously. To put it simply, in order to implement the cooperative transmission of multiple sending ends in an actual network, it is necessary that a cooperative transmission solution can be supported in aspects of synchronization (including time synchronization and crystal oscillator synchronization), sharing of information such as data and the like, obtaining of channel information and data transmission and the like.

In the prior art, a technical solution for synchronization, sharing of information such as data and the like, obtaining of channel information and data transmission, has larger overhead, lower work efficiency and limited application scenarios in an actual application.

SUMMARY

Embodiments of the present disclosure provide a method and a device, which reduce overhead and improve work efficiency in an application of cooperative transmission in aspects of synchronization, sharing of information such as data and the like, obtaining of channel information and data transmission. Meanwhile, application scenarios may also be extended.

In order to achieve the above-mentioned objective, the embodiments of the present disclosure employ the following technical solutions:

In a first aspect, a transmission method applied to a cooperative transmission is provided, wherein the method includes:

obtaining, by an access point AP, a parameter value, wherein the parameter value is a frequency difference between a crystal oscillator frequency of the AP and a crystal oscillator frequency of a reference AP or a delay difference of the AP with respect to the reference AP;

compensating, by the AP, a phase difference or a time difference according to the parameter value when both of the AP and the reference AP send data.

In a first possible implementation manner, in combination with the first aspect, the parameter value is a frequency difference between the crystal oscillator frequency of the AP and the crystal oscillator frequency of the reference AP, and the obtaining, by an access point AP, a parameter value includes:

receiving a reference crystal oscillator frequency sent by a primary AP, wherein the primary AP is any of APs having control function;

calculating the frequency difference between the crystal oscillator frequency of the AP and the crystal oscillator frequency of the reference AP according to the crystal oscillator frequency of the reference AP.

In a second possible implementation manner, in combination with the first aspect, the parameter value is the frequency difference between the crystal oscillator frequency of the AP and the crystal oscillator frequency of the reference AP, and the obtaining, by an access point AP, a parameter value includes:

sending the crystal oscillator frequency of the AP to the primary AP, so that the primary AP selects the crystal oscillator frequency of the reference AP and calculates the frequency difference between the crystal oscillator frequency of the AP and the crystal oscillator frequency of the reference AP according to the crystal oscillator frequency of the reference AP and the crystal oscillator frequency of the AP;

receiving the frequency difference between the crystal oscillator frequency of the AP and the crystal oscillator frequency of the reference AP sent by the primary AP.

In a third possible implementation manner, in combination with the first aspect, the parameter value is the frequency difference between the crystal oscillator frequency of the AP and the crystal oscillator frequency of the reference AP, and the obtaining, by an access point AP, a parameter value includes:

sending a first channel measured symbol to a station STA repeatedly at least twice, so that the STA calculates a first channel matrix with respect to the AP twice according to the first channel measured symbol and calculates the frequency difference between the crystal oscillator frequency of the AP and the crystal oscillator frequency of the reference AP according to the first channel matrix and a second channel matrix obtained, wherein channel parameter matrixes of both the first channel matrix and the second channel matrix are unchanged, and the second channel matrix is a channel matrix with respect to the reference AP calculated by the STA according to a second channel measured symbol sent by the reference AP;

receiving the frequency difference between the crystal oscillator frequency of the AP and the crystal oscillator frequency of the reference AP sent by the station STA.

In a fourth possible implementation manner, in combination with the first aspect, the parameter value is the frequency difference between the crystal oscillator frequency of the AP and the crystal oscillator frequency of the reference AP, and the obtaining, by an access point AP, a parameter value includes:

sending a first channel measured symbol to a station STA repeatedly at least twice, so that the STA and the reference AP calculate a first channel matrix with respect to the AP twice according to the first channel measured symbol and calculate the frequency difference between the crystal oscillator frequency of the AP and the crystal oscillator frequency of the reference AP according to the first channel matrix and a second channel matrix, wherein channel parameter matrixes of both the first channel matrix and the second channel matrix are unchanged, and the second channel matrix is a channel matrix with respect to the reference AP calculated by the STA according to a second channel measured symbol sent by the reference AP;

receiving the frequency difference between the crystal oscillator frequency of the AP and the crystal oscillator frequency of the reference AP sent by the reference AP.

In a fifth possible implementation manner, in combination with the first aspect, the parameter value is the delay difference of the AP with respect to the reference AP, and the obtaining, by an access point AP, a parameter value includes:

receiving a signal frame sent by an STA, wherein the signal frame carries a reference time;

calculating a sum of a sending delay and a propagation delay of the STA according to the reference time subtracting a sum of a sending delay and a propagation delay of the STA obtained by the reference AP from the calculated sum of the sending delay and the propagation delay of the STA to obtain a propagation delay difference and a processing delay difference for sending with respect to the reference AP, wherein the sum of the sending delay and the propagation delay of the STA obtained by the reference AP is calculated by the reference AP according to the reference time and sent to the AP.

In a second aspect, a transmission method applied to a cooperative transmission is provided, wherein the method includes:

receiving, by a station STA, a first channel measured symbol sent by an access point AP repeatedly at least twice;

receiving a second channel measured symbol sent by a reference AP repeatedly at least twice;

calculating a first channel matrix with respect to the AP according to the first channel measured symbol;

calculating a second channel matrix with respect to the reference AP according to the second channel measured symbol;

calculating a frequency difference between a crystal oscillator frequency of the AP and a crystal oscillator frequency of the reference AP according to the first channel matrix and the second channel matrix.

In a first possible implementation manner, in combination with the second aspect, the calculating a frequency difference between a crystal oscillator frequency of the AP and a crystal oscillator frequency of the reference AP according to the first channel matrix and the second channel matrix includes:

obtaining a first difference according to the first channel matrix, wherein the first difference is a frequency difference between a local crystal oscillator frequency and the crystal oscillator frequency of the AP;

obtaining a second difference according to the second channel matrix, wherein the second difference is a frequency difference between the local crystal oscillator frequency and the crystal oscillator frequency of the reference AP;

calculating the frequency difference between the crystal oscillator frequency of the AP and the crystal oscillator frequency of the reference AP according to the first difference and the second difference;

sending the frequency difference between the crystal oscillator frequency of the AP and the crystal oscillator frequency of the reference AP to the AP.

In a second possible implementation manner, in combination with the second aspect, the calculating a frequency difference between a crystal oscillator frequency of the AP and a crystal oscillator frequency of the reference AP according to the first channel matrix and the second channel matrix includes:

obtaining a first difference according to the first channel matrix, wherein the first difference is a frequency difference between a local crystal oscillator frequency and the crystal oscillator frequency of the AP;

obtaining a second difference according to the second channel matrix, wherein the second difference is a frequency difference between the local crystal oscillator frequency and the crystal oscillator frequency of the reference AP;

sending the first difference and the second difference to the reference AP, so that the reference AP calculates the frequency difference between the crystal oscillator frequency of the AP and the crystal oscillator frequency of the reference AP according to the first difference and the second difference, and sending the frequency difference between the crystal oscillator frequency of the AP and the crystal oscillator frequency of the reference AP to the AP.

In a third aspect, a transmission method applied to a cooperative transmission is provided, wherein the method includes:

determining, by an access point AP, an obtained data category of data sent by an STA;

storing the data in a buffer in accordance with indication information if the data category of the data is joint transmission;

reading, by the AP, the buffer and sending data in the buffer when a primary AP sends data, wherein the primary AP is any of APs having control function.

In a first possible implementation manner, in combination with the third aspect, the buffer is an access category joint transmission AC_JT buffer, and the AP determines the data category of the data includes:

determining the data category of the data according to a joint transmission_indication JT_IDX carried in the data.

In a second possible implementation manner, in combination with the first possible implementation manner, the indication information is a data transmission order carried in the data, and the storing the data in a buffer in accordance with indication information if the data category of the data is joint transmission includes:

storing the data in the AC_JT buffer in accordance with the data transmission order carried in the data if the data category of the data is used for the joint transmission.

In a third possible implementation manner, in combination with the first possible implementation manner, the indication information is a data transmission order indicated in an indication command, and the storing the data in a buffer in accordance with indication information if the data category of the data is joint transmission includes:

sorting the data as an AC_JT access category if the data category of the data is the joint transmission;

categorizing the data in the AC_JT buffer in accordance with the data transmission order indicated in the indication command, wherein the indication command is carried in the data.

In a fourth possible implementation manner, in combination with the second possible implementation manner or the third possible implementation manner, the method further includes:

storing the data in an access category queue corresponding to the data according to service category information carried in the data if the data category of the data is not the joint transmission.

In a fifth possible implementation manner, in combination with the third aspect, the buffer is a joint transmission buffer JT Buffer, and the AP determines the data category of the data includes:

selecting data that needs to be jointly transmitted from a local access category buffer according to an obtained indication of data that needs to be jointly transmitted sent by the STA, wherein the local access category includes an access category voice AC_VO, an access category video AC_VI, an access category best effort AC_BE or an access category background AC_BK;

determining the data category of the data as the joint transmission.

In a sixth possible implementation manner, in combination with the fifth possible implementation manner, the indication information is a data transmission order indicated in an instruction command prestored in the JT Buffer buffer, and the storing the data in a buffer in accordance with indication information if the data category of the data is joint transmission includes:

storing the data in the JT Buffer buffer according to the data transmission order indicated in the instruction command prestored in the JT Buffer buffer if the data category of the data is the joint transmission, wherein the instruction command is stored in the JT Buffer buffer by the AP.

In a fourth aspect, a transmission method applied to a cooperative transmission is provided, wherein the method includes:

receiving, by an access point AP, channel information sent by any of STAs;

sending the channel information to a primary AP, so that the primary AP calculates a precoding matrix according to the channel information and a precoding rule and sends it to the AP through indication information, wherein the indication information carries the precoding matrix and a stream indication corresponding to each AP, and the stream indication is used for indicating a part of the precoding matrix used by each AP and a corresponding number of streams;

receiving the precoding matrix sent by the primary AP;

obtaining a sub-precoding matrix according to the precoding matrix;

encoding input data according to the sub-precoding matrix.

In a first possible implementation manner, in combination with the fourth aspect, the obtaining a sub-precoding matrix according to the precoding matrix includes:

calculating the sub-precoding matrix according to the obtained stream indication and the precoding matrix, wherein the stream indication carries a submatrix of the sub-precoding matrix.

In a fifth aspect, a transmission method applied to a cooperative transmission is provided, wherein the method includes:

sending, by a primary AP, data to a station STA, wherein the data is capable of indicating all APs and STAs participating in the cooperative transmission;

receiving an acknowledgement ACK frame sent by the STA after the STA receives the data, so that any of the APs participating in the cooperative transmission determines its own data transmission time, so as to avoid occurrence of a conflict, wherein the ACK frame carries all the APs and STAs participating in the cooperative transmission.

In a first possible implementation manner, in combination with the fifth aspect, the method further includes:

obtaining a response block acknowledgement BA for successful transmission sent by any of the STAs.

In a sixth aspect, an AP applied to a cooperative transmission is provided, including:

an obtaining unit, configured to obtain a parameter value, wherein the parameter value is a frequency difference between a crystal oscillator frequency of the AP and a crystal oscillator frequency of a reference AP or a delay difference of the AP with respect to the reference AP;

a processing unit, configured to compensate a phase difference or a time difference according to the parameter value when both of the AP and the reference AP send data.

In a first possible implementation manner, in combination with the sixth aspect, the parameter value is the frequency difference between the crystal oscillator frequency of the AP and the crystal oscillator frequency of the reference AP, and the obtaining unit includes:

a receiving module, configured to receive the crystal oscillator frequency of the reference AP sent by a primary AP, wherein the primary AP is any of APs having control function;

a calculating module, configured to calculate the frequency difference between the crystal oscillator frequency of the AP and the crystal oscillator frequency of the reference AP according to the crystal oscillator frequency of the reference AP.

In a second possible implementation manner, in combination with the sixth aspect, the parameter value is the frequency difference between the crystal oscillator frequency of the AP and a reference crystal oscillator frequency of the reference AP, and the obtaining unit includes:

a sending module, configured to send the crystal oscillator frequency of the AP to the primary AP, so that the primary AP selects the crystal oscillator frequency of the reference AP and calculates the frequency difference between the crystal oscillator frequency of the AP and the crystal oscillator frequency of the reference AP according to the crystal oscillator frequency of the reference AP and the crystal oscillator frequency of the AP;

a receiving module, configured to receive the frequency difference between the crystal oscillator frequency of the AP and the crystal oscillator frequency of the reference AP sent by the primary AP.

In a third possible implementation manner, in combination with the sixth aspect, the parameter value is the frequency difference between the crystal oscillator frequency of the AP and the crystal oscillator frequency of the reference AP, and the obtaining unit comprises:

a sending module is further configured to send a first channel measured symbol to a station STA repeatedly at least twice, so that the STA calculates a first channel matrix with respect to the AP twice according to the first channel measured symbol and calculates the frequency difference between the crystal oscillator frequency of the AP and the crystal oscillator frequency of the reference AP according to the first channel matrix and a second channel matrix obtained, wherein channel parameter matrixes of both the first channel matrix and the second channel matrix are unchanged, and the second channel matrix is a channel matrix with respect to the reference AP calculated by the STA according to a second channel measured symbol sent by the reference AP;

a receiving module is further configured to receive the frequency difference between the crystal oscillator frequency of the AP and the crystal oscillator frequency of the reference AP sent by the station STA.

In a fourth possible implementation manner, in combination with the sixth aspect, the parameter value is the frequency difference between the crystal oscillator frequency of the AP and the crystal oscillator frequency of the reference AP, and the obtaining unit comprises:

a sending module, configured to send a first channel measured symbol to a station STA repeatedly at least twice, so that the STA and the reference AP calculate a first channel matrix with respect to the AP twice according to the first channel measured symbol and calculate the frequency difference between the crystal oscillator frequency of the AP and the crystal oscillator frequency of the reference AP according to the first channel matrix and a second channel matrix, wherein channel parameter matrixes of both the first channel matrix and the second channel matrix are unchanged, and the second channel matrix is a channel matrix with respect to the reference AP calculated by the STA according to a second channel measured symbol sent by the reference AP;

a receiving module, configured to receive the frequency difference between the crystal oscillator frequency of the AP and the crystal oscillator frequency of the reference AP sent by the reference AP.

In a fifth possible implementation manner, in combination with the sixth aspect, the parameter value is the delay difference of the AP with respect to the reference AP, and the obtaining unit includes:

a receiving module, configured to receive a signal frame sent by an STA, wherein the signal frame carries a reference time;

a calculating module, configured to calculate a sum of a sending delay and a propagation delay of the STA according to the reference time;

an obtaining module, configured to subtract a sum of a sending delay and a propagation delay of the STA obtained by the reference AP from the calculated sum of the sending delay and the propagation delay of the STA to obtain a propagation delay difference and a processing delay difference for sending with respect to the reference AP, wherein the sum of the sending delay and the propagation delay of the STA obtained by the reference AP is calculated by the reference AP according to the reference time and sent to the AP.

In a seventh aspect, an STA applied to a cooperative transmission is provided, including:

a receiving unit, configured to receive a first channel measured symbol sent by an access point AP repeatedly at least twice, wherein the receiving unit is further configured to receive a second channel measured symbol sent by a reference AP repeatedly at least twice;

a calculating unit, configured to calculate a first channel matrix with respect to the AP according to the first channel measured symbol;

the calculating unit is further configured to calculate a second channel matrix with respect to the reference AP according to the second channel measured symbol;

an obtaining unit, configured to calculate a frequency difference between a crystal oscillator frequency of the AP and a crystal oscillator frequency of the reference AP according to the first channel matrix and the second channel matrix.

In a first possible implementation manner, in combination with the seventh aspect, the obtaining unit includes:

an obtaining module, configured to obtain a first difference according to the first channel matrix, wherein the first difference is a frequency difference between a local crystal oscillator frequency and the crystal oscillator frequency of the AP, wherein the obtaining module is further configured to obtain a second difference according to the second channel matrix, wherein the second difference is a frequency difference between the local crystal oscillator frequency and the crystal oscillator frequency of the reference AP;

a calculating module, configured to calculate the frequency difference between the crystal oscillator frequency of the AP and the crystal oscillator frequency of the reference AP according to the first difference and the second difference; wherein the STA further comprises:

a sending unit, configured to send the frequency difference between the crystal oscillator frequency of the AP and the crystal oscillator frequency of the reference AP to the AP.

In a second possible implementation manner, in combination with the seventh aspect, the obtaining unit includes:

a obtaining module, configured to obtain a first difference according to the first channel matrix, wherein the first difference is a frequency difference between a local crystal oscillator frequency and the crystal oscillator frequency of the AP, wherein the obtaining module is further configured to obtain a second difference according to the second channel matrix, wherein the second difference is a frequency difference between the local crystal oscillator frequency and the crystal oscillator frequency of the reference AP;

a sending module, configured to send the first difference and the second difference to the reference AP, so that the reference AP calculates the frequency difference between the crystal oscillator frequency of the AP and the crystal oscillator frequency of the reference AP according to the first difference and the second difference, and send the frequency difference between the crystal oscillator frequency of the AP and the crystal oscillator frequency of the reference AP to the AP.

In an eighth aspect, an AP applied to a cooperative transmission is provided, including:

a determining unit, configured to determine an obtained data category of data sent by an STA;

a processing unit, configured to store the data in a buffer in accordance with indication information if the data category of the data is joint transmission;

the AP reads the buffer and sends data in the buffer when a primary AP sends data, wherein the primary AP is any of APs having control function.

In a first possible implementation manner, in combination with the eighth aspect, the buffer is an access category joint transmission AC_JT buffer, and the determining unit is specifically configured to:

determine the data category of the data according to a joint transmission_indication JT_IDX carried in the data.

In a second possible implementation manner, in combination with the first possible implementation manner, the indication information is a data transmission order carried in the data, and the processing unit includes:

a first processing module, configured to store the data in the AC_JT buffer in accordance with the data transmission order carried in the data if the data category of the data is the joint transmission.

In a third possible implementation manner, in combination with the first possible implementation manner, the indication information is a data transmission order indicated in an indication command, and the processing unit further includes:

a second processing module, configured to sort the data as an AC_JT access category if the data category of the data is the joint transmission, wherein the second processing module is further configured to store the data in the AC_JT buffer according to the data transmission order indicated in the indication command, wherein the indication command is carried in the data.

In a fourth possible implementation manner, in combination with the second possible implementation manner or the third possible implementation manner, the AP further includes:

a storage unit, configured to store the data in an access category queue corresponding to the data according to service category information carried in the data if the data category of the data is not the joint transmission.

In a fifth possible implementation manner, in combination with the eighth aspect, the buffer is a joint transmission buffer JT Buffer, and the determining unit includes: a selecting module, configured to select data that needs to be jointly transmitted from a local access category buffer according to an obtained indication of data that needs to be jointly transmitted sent by the STA, wherein the local access category includes an access category voice AC_VO, an access category video AC_VI, an access category best effort AC_BE or an access category background AC_BK;

an determining module, configured to determining the data category of the data as the joint transmission.

In a sixth possible implementation manner, in combination with the fifth possible implementation manner, the indication information is a data transmission order indicated in an instruction command prestored in the JT Buffer buffer, and the processing unit further includes:

a third processing module, configured to store the data in the JT Buffer buffer according to the data transmission order indicated in the instruction command prestored in the JT Buffer buffer if the data category of the data is the joint transmission, wherein the instruction command is stored in the JT Buffer buffer by the AP.

In a ninth aspect, an AP applied to a cooperative transmission is provided, including:

a receiving unit, configured to receive channel information sent by a station STA;

a calculating unit, configured to calculate a precoding matrix according to a precoding rule and the channel information;

a sending unit, configured to send the channel information to a primary AP, so that the primary AP calculates a precoding matrix according to the channel information and a precoding rule and sends it to the AP through indication information, wherein the indication information carries the precoding matrix and a stream indication corresponding to each AP, and the stream indication is used for indicating a part of the precoding matrix used by each AP and a corresponding number of streams.

the receiving unit, further configured to receive the precoding matrix sent by the primary AP;

an obtaining unit, configured to obtain a sub-precoding matrix according to the precoding matrix;

a coding unit, configured to code input data according to the sub-precoding matrix.

In a first possible implementation manner, in combination with the ninth aspect, the obtaining unit is specifically configured to:

calculate the sub-precoding matrix according to the obtained stream indication and precoding matrix, wherein the stream indication carries a submatrix of the sub-precoding matrix.

In a tenth aspect, a primary AP applied to a cooperative transmission is provided, including:

a sending unit, configured to send data to a station STA, wherein the data is capable of indicating all APs and STAs participating in the cooperative transmission;

a receiving unit, configured to receive an acknowledgement ACK frame sent by the STA after the STA receives the data, so that any of the APs participating in the cooperative transmission determines its own data transmission time, so as to avoid occurrence of a conflict, wherein the ACK frame carries all the APs and STAs participating in the cooperative transmission.

In a first possible implementation manner, in combination with the tenth aspect, the primary AP further includes:

an obtaining unit, configured to obtain a response block acknowledgement BA for successful transmission sent by any of the STAs.

In an eleventh aspect, an AP applied to a cooperative transmission is provided, wherein the AP includes:

at least one processor, a memory, a communication interface and a bus, wherein the at least one processor, the memory, the communication interface are connected and implement communication between each other through the bus, and the memory is configured to store a program code, wherein, the processor is configured to call the program code in the memory to perform the following operations:

obtaining a parameter value, wherein the parameter value is a frequency difference between a crystal oscillator frequency of the AP and a crystal oscillator frequency of a reference AP or a delay difference of the AP with respect to the reference AP;

compensating a phase difference or a time difference according to the parameter value when both of the AP and the reference AP send data.

In a first possible implementation manner, in combination with the eleventh aspect, the parameter value is a frequency difference between the crystal oscillator frequency of the AP and the crystal oscillator frequency of the reference AP, and the processor is specifically configured to:

receive the crystal oscillator frequency of the reference AP sent by a primary AP, wherein the primary AP is any of APs having control function;

calculate the frequency difference between the crystal oscillator frequency of the AP and the crystal oscillator frequency of the reference AP according to the crystal oscillator frequency of the reference AP.

In a second possible implementation manner, in combination with the eleventh aspect, the parameter value is a frequency difference between the crystal oscillator frequency of the AP and the crystal oscillator frequency of the reference AP, and the processor is specifically configured to:

send the crystal oscillator frequency of the AP to the primary AP, so that the primary AP selects the crystal oscillator frequency of the reference AP and calculates the frequency difference between the crystal oscillator frequency of the AP and the crystal oscillator frequency of the reference AP according to the crystal oscillator frequency of the reference AP and the crystal oscillator frequency of the AP;

receive the frequency difference between the crystal oscillator frequency of the AP and the crystal oscillator frequency of the reference AP sent by the primary AP.

In a third possible implementation manner, in combination with the eleventh aspect, the parameter value is a frequency difference between the crystal oscillator frequency of the AP and the crystal oscillator frequency of the reference AP, and the processor is specifically configured to:

send a first channel measured symbol to a station STA repeatedly at least twice, so that the STA calculates a first channel matrix with respect to the AP twice according to the first channel measured symbol and calculates the frequency difference between the crystal oscillator frequency of the AP and the crystal oscillator frequency of the reference AP according to the first channel matrix and a second channel matrix obtained, wherein channel parameter matrixes of both the first channel matrix and the second channel matrix are unchanged, and the second channel matrix is a channel matrix with respect to the reference AP calculated by the STA according to a second channel measured symbol sent by the reference AP;

receive the frequency difference between the crystal oscillator frequency of the AP and the crystal oscillator frequency of the reference AP sent by the station STA.

In a fourth possible implementation manner, in combination with the eleventh aspect, the parameter value is a frequency difference between the crystal oscillator frequency of the AP and the crystal oscillator frequency of the reference AP, and the processor is specifically configured to:

send a first channel measured symbol to a station STA repeatedly at least twice, so that the STA and the reference AP calculate a first channel matrix with respect to the AP twice according to the first channel measured symbol and calculate the frequency difference between the crystal oscillator frequency of the AP and the crystal oscillator frequency of the reference AP according to the first channel matrix and a second channel matrix, wherein channel parameter matrixes of both the first channel matrix and the second channel matrix are unchanged, and the second channel matrix is a channel matrix with respect to the reference AP calculated by the STA according to a second channel measured symbol sent by the reference AP;

receive the frequency difference between the crystal oscillator frequency of the AP and the crystal oscillator frequency of the reference AP sent by the reference AP.

In a fifth possible implementation manner, in combination with the eleventh aspect, the parameter value is a delay difference of the AP with respect to the reference AP, and the processor is specifically configured to:

receive a signal frame sent by an STA, wherein the signal frame carries a reference time;

calculate a sum of a sending delay and a propagation delay of the STA according to the reference time;

subtract a sum of a sending delay and a propagation delay of the STA obtained by the reference AP from the calculated sum of the sending delay and the propagation delay of the STA to obtain a propagation delay difference and a processing delay difference for sending with respect to the reference AP, wherein the sum of the sending delay and the propagation delay of the STA obtained by the reference AP is calculated by the reference AP according to the reference time and sent to the AP.

In a twelfth aspect, an STA applied to a cooperative transmission is provided, wherein the STA includes: at least one processor, a memory, a communication interface and a bus, wherein the at least one processor, the memory, and the communication interface are connected and implement communication between each other through the bus, and the memory is configured to store a program code, wherein, the processor is configured to call the program code in the memory to perform the following operations:

receiving a first channel measured symbol sent by an access point AP repeatedly at least twice;

receiving a second channel measured symbol sent by a reference AP repeatedly at least twice;

calculating a first channel matrix with respect to the AP according to the first channel measured symbol;

calculating a second channel matrix with respect to the reference AP according to the second channel measured symbol;

calculating a frequency difference between a crystal oscillator frequency of the AP and a crystal oscillator frequency of the reference AP according to the first channel matrix and the second channel matrix.

In a first possible implementation manner, in combination with the twelfth aspect, the processor is specifically configured to:

obtain a first difference according to the first channel matrix, wherein the first difference is a frequency difference between a local crystal oscillator frequency and the crystal oscillator frequency of the AP;

obtain a second difference according to the second channel matrix, wherein the second difference is a frequency difference between the local crystal oscillator frequency and the crystal oscillator frequency of the reference AP;

calculate the frequency difference between the crystal oscillator frequency of the AP and the crystal oscillator frequency of the reference AP according to the first difference and the second difference;

send the frequency difference between the crystal oscillator frequency of the AP and the crystal oscillator frequency of the reference AP to the AP.

In a second possible implementation manner, in combination with the twelfth aspect, the processor is specifically configured to:

obtain a first difference according to the first channel matrix, wherein the first difference is a frequency difference between a local crystal oscillator frequency and the crystal oscillator frequency of the AP;

obtain a second difference according to the second channel matrix, wherein the second difference is a frequency difference between the local crystal oscillator frequency and the crystal oscillator frequency of the reference AP;

send the first difference and the second difference to the reference AP, so that the reference AP calculates the frequency difference between the crystal oscillator frequency of the AP and the crystal oscillator frequency of the reference AP according to the first difference and the second difference, and send the frequency difference between the crystal oscillator frequency of the AP and the crystal oscillator frequency of the reference AP to the AP.

In a thirteenth aspect, an AP applied to a cooperative transmission is provided, wherein the AP includes at least one processor, a memory, a communication interface and a bus, wherein the at least one processor, the memory, and the communication interface are connected and implement communication between each other through the bus, and the memory is configured to store a program code, wherein, the processor is configured to call the program code in the memory to perform the following operations:

determining an obtained data category of data sent by an STA;

storing the data in a buffer in accordance with indication information if the data category of the data is joint transmission;

reading, by the AP, the buffer and sending data in the buffer when a primary AP sends data, wherein the primary AP is any of APs having a control function.

In a first possible implementation manner, in combination with the thirteenth aspect, the buffer is an access category joint transmission AC_JT buffer, and the processor is specifically configured to:

determine the data category of the data according to a joint transmission_indication JT_IDX carried in the data.

In a second possible implementation manner, in combination with the first possible implementation manner, the indication information is a data transmission order carried in the data, and the processor is specifically configured to:

store the data in the AC_JT buffer in accordance with the data transmission order carried in the data if the data category of the data is the joint transmission.

In a third possible implementation manner, in combination with the first possible implementation manner, the indication information is a data transmission order indicated in an indication command, and the processor is specifically configured to:

sort the data as an AC_JT access category if the data category of the data is the joint transmission;

store the data in the AC_JT buffer according to the data transmission order indicated in the indication command, wherein the instruction command is carried in the data.

In a fourth possible implementation manner, in combination with the second possible implementation manner or the third possible implementation manner, the processor is further configured to store the data in an access category queue corresponding to the data according to service category information carried in the data if the data category of the data is not the joint transmission.

In a fifth possible implementation manner, in combination with the thirteenth aspect, the buffer is a joint transmission buffer JT Buffer, and the processor is specifically configured to:

select data that needs to be jointly transmitted from a local access category buffer according to an obtained indication data that needs to be jointly transmitted sent by the STA, wherein the local access category includes an access category voice AC_VO, an access category video AC_VI, an access category best effort AC_BE or an access category background AC_BK;

determining the data category of the data as the joint transmission.

In a sixth possible implementation manner, in combination with the fifth possible implementation manner, the indication information is a data transmission order indicated in an instruction command prestored in the JT Buffer buffer, and the processor is specifically configured to:

store the data in the JT Buffer buffer according to the data transmission order indicated in the instruction command prestored in the JT Buffer buffer if the data category of the data is the joint transmission, wherein the instruction command is stored in the JT Buffer buffer by the AP.

In a fourteenth aspect, an AP applied to a cooperative transmission is provided, wherein the AP comprises: at least one processor, a memory, a communication interface and a bus, wherein the at least one processor, the memory and the communication interface are connected and implement communication between each other through the bus, and the memory is configured to store a program code, wherein, the processor is configured to call the program code in the memory to perform the following operations:

receiving channel information sent by a station STA;

sending the channel information to a primary AP, so that the primary AP calculates a precoding matrix according to the channel information and a precoding rule and sends it to the AP through indication information, wherein the indication information carries the precoding matrix and a stream indication corresponding to each AP, and the stream indication is used for indicating a part of the precoding matrix used by each AP and a corresponding number of streams.

receiving the precoding matrix sent by the primary AP;

obtaining a sub-precoding matrix according to the precoding matrix;

coding input data according to the sub-precoding matrix.

In a first possible implementation manner, in combination with the fourteenth aspect, the processor is specifically configured to:

calculate the sub-precoding matrix according to the obtained stream indication and the precoding matrix, wherein the stream indication carries a submatrix of the sub-precoding matrix.

In a fifteenth aspect, a primary AP applied to a cooperative transmission is provided, wherein the primary AP includes at least one processor, a memory, a communication interface and a bus, wherein the at least one processor, the memory, the communication interface are linked with the bus and complete communication between each other, and the memory is configured to store a program code, wherein, the processor is configured to call the program code in the memory for performing the following operations:

sending data to a station STA, wherein the data is capable of indicating all APs and STAs participating in the cooperative transmission;

receiving an acknowledgement ACK frame sent by the STA after the STA receives the data, so that any of the APs participating in the cooperative transmission determines its own data transmission time, so as to avoid occurrence of a conflict, wherein the ACK frame carries all the APs and STAs participating in the cooperative transmission.

In a first possible implementation manner, in combination with the fifteenth aspect, the processor is further configured to:

obtain a response block acknowledgement BA for successful transmission sent by any of the STAs.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

BRIEF DESCRIPTION OF DRAWINGS

To illustrate the technical solutions in embodiments of the present disclosure or in the prior art more clear, a brief introduction on the drawings which are needed in the description of the embodiments or the prior art will be given below. It is obvious to ordinary ones skilled in the art that these drawings described below are only for some embodiments of the present disclosure and other drawings may be obtained from these drawings without any creative effort.

DESCRIPTION OF EMBODIMENTS

Hereinafter, the technical solutions in embodiments of the present disclosure would be clearly and fully described in combination with the accompanying drawings in the embodiments of the present disclosure. Obviously, the embodiments described are only a part of the embodiments of the present disclosure, but not all the embodiments. Based on the embodiments in the present disclosure, all other embodiments obtained by ordinary ones skilled in the art without any creative effort would fall within the protection scope of the invention.

Figure 1:
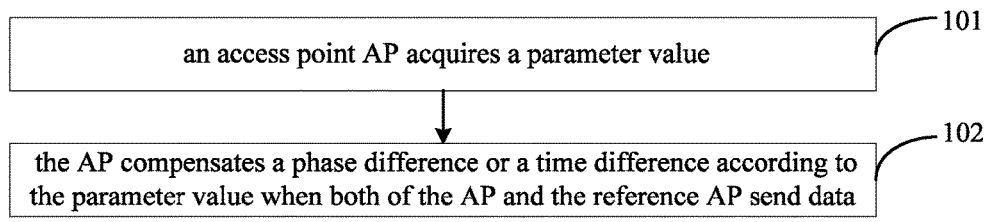
FIG. 1 is a schematic flow diagram of a transmission method provided in an embodiment of the present disclosure.

An embodiment of the present disclosure provides a transmission method applied to a cooperative transmission, as shown in FIG. 1, and the method includes the following steps:

101. an access point (Access Point, referred to as AP) obtains a parameter value.

The parameter value is a frequency difference between a crystal oscillator frequency of the AP and a crystal oscillator frequency of a reference AP or, a delay difference of the AP with respect to the reference AP.

102. the AP compensates a phase difference or a time difference according to the parameter value when both of the AP and the reference AP send data.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 2:
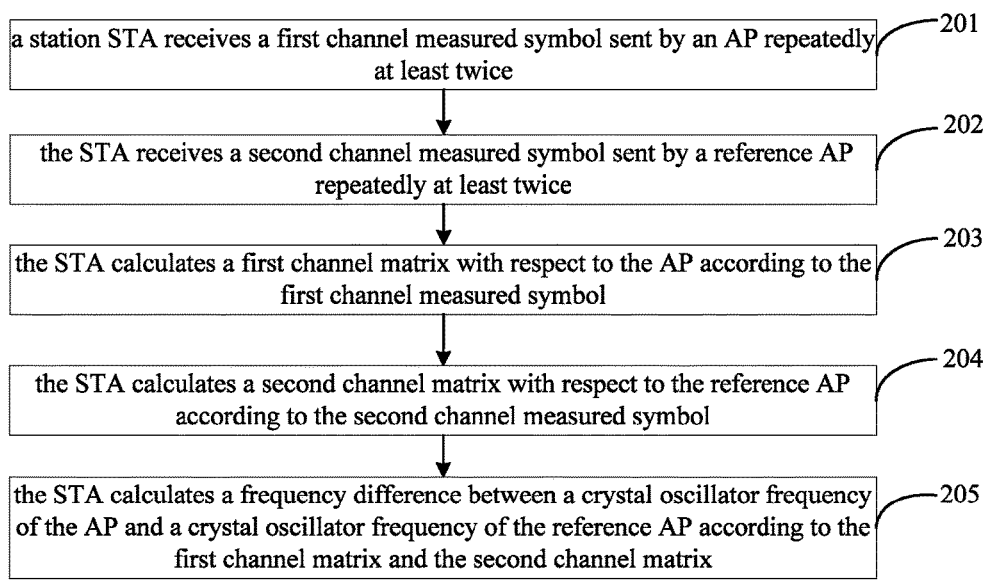
FIG. 2 is a schematic flow diagram of another transmission method provided in an embodiment of the present disclosure.

An embodiment of the present disclosure provides a transmission method, applied to a cooperative transmission, as shown in FIG. 2, and the method includes the following steps:

201. a station (Station, referred to as STA) receives a first channel measured symbol sent by an access point AP repeatedly at least twice.

202. the STA receives a second channel measured symbol sent by a reference AP repeatedly at least twice.

203. the STA calculates a first channel matrix with respect to the AP according to the first channel measured symbol.

204. the STA calculates a second channel matrix with respect to the reference AP according to the second channel measured symbol.

205. the STA calculates a frequency difference between a crystal oscillator frequency of the AP and a crystal oscillator frequency of the reference AP according to the first channel matrix and the second channel matrix.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 3:
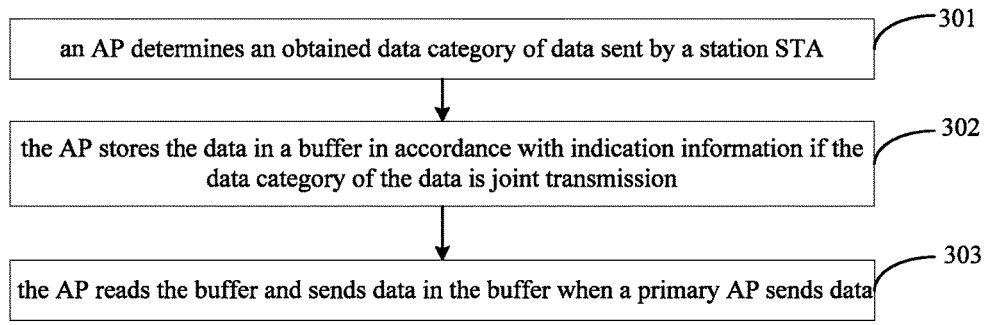
FIG. 3 is a schematic flow diagram of yet another transmission method provided in an embodiment of the present disclosure.

An embodiment of the present disclosure provides a transmission method, applied to a cooperative transmission, as shown in FIG. 3, and the method includes the following steps:

301. an access point AP determines an obtained data category of data sent by a station STA.

302. the AP stores the data in a buffer in accordance with indication information if the data category of the data is joint transmission.

303. the AP reads the buffer and sends the data in the buffer when a primary AP sends data.

The primary AP is any of APs having a control function.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 4:
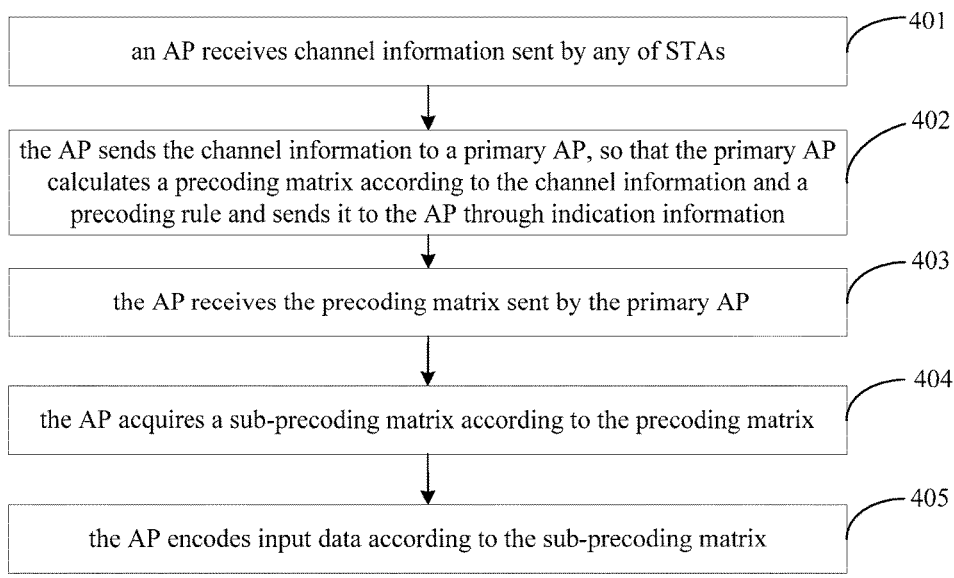
FIG. 4 is a schematic flow diagram of still another transmission method provided in an embodiment of the present disclosure.

An embodiment of the present disclosure provides a transmission method applied to a cooperative transmission, as shown in FIG. 4, and the method includes the following steps:

401. an access point AP receives channel information sent by a station STA.

402. the AP sends the channel information to a primary AP, so that the primary AP calculates a precoding matrix according to the channel information and a precoding rule and sends it to the AP through indication information.

The indication information carries the precoding matrix and a stream indication corresponding to each AP, and the stream indication is used for indicating a part of the precoding matrix used by each AP and a corresponding number of streams.

403. the AP receives the precoding matrix sent by the primary AP.

404. the AP obtains a sub-precoding matrix according to the precoding matrix.

405. the AP encodes input data according to the sub-precoding matrix.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 5:
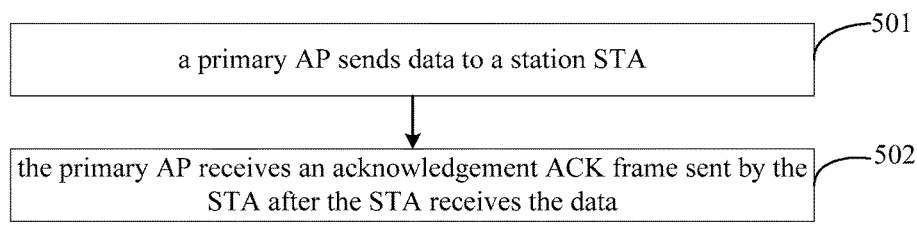
FIG. 5 is a schematic flow diagram of a transmission method provided in another embodiment of the present disclosure.

An embodiment of the present disclosure provides a transmission method applied to a cooperative transmission, as shown in FIG. 5, and the method includes the following steps:

501. a primary AP sends data to a station STA.

The data may indicate all AP(s) and STA(s) participating in the cooperative transmission.

502. the primary AP receives an acknowledgement ACK frame sent by the STA after the STA receives the data, so that any of the APs participating in the cooperative transmission determines its own data transmission time, so as to avoid occurrence of a conflict.

The ACK frame carries all the AP(s) and STA(s) participating in the cooperative transmission.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 6:
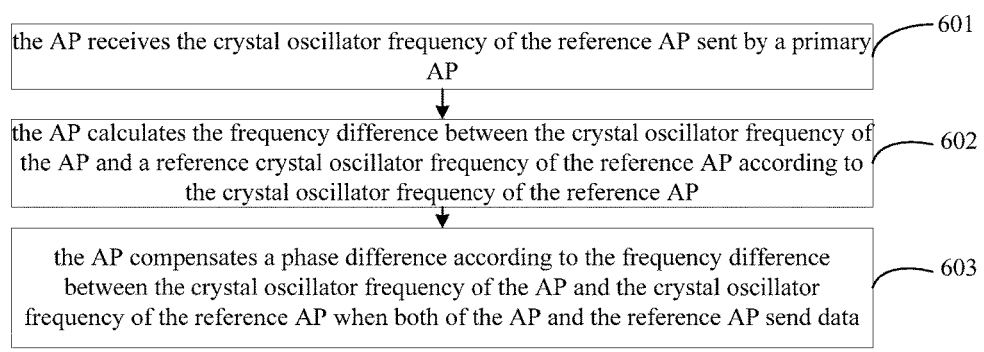
FIG. 6 is a schematic flow diagram of another transmission method provided in another embodiment of the present disclosure.

An embodiment of the present disclosure provides a transmission method applied to a cooperative transmission. The parameter value is a frequency difference between a crystal oscillator frequency of an AP and a crystal oscillator frequency of a reference AP. As shown in FIG. 6, the method includes the following steps:

An information transmission method provided in the present implementation is mainly applied to phase synchronization during a synchronization process of joint transmission, interference alignment and coordinated beamforming.

601. the AP receives the crystal oscillator frequency of the reference AP sent by a primary AP.

The primary AP is any of APs having a control function.

602. the AP calculates the frequency difference between the crystal oscillator frequency of the AP and the crystal oscillator frequency of the reference AP according to the crystal oscillator frequency of the reference AP.

603. the AP compensates a phase difference according to the frequency difference between the crystal oscillator frequency of the AP and the crystal oscillator frequency of the reference AP when both of the AP and the reference AP send data.

An interconnected wired network is mainly employed to implement synchronization of a phase in a phase synchronization method in the present embodiment.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 7:
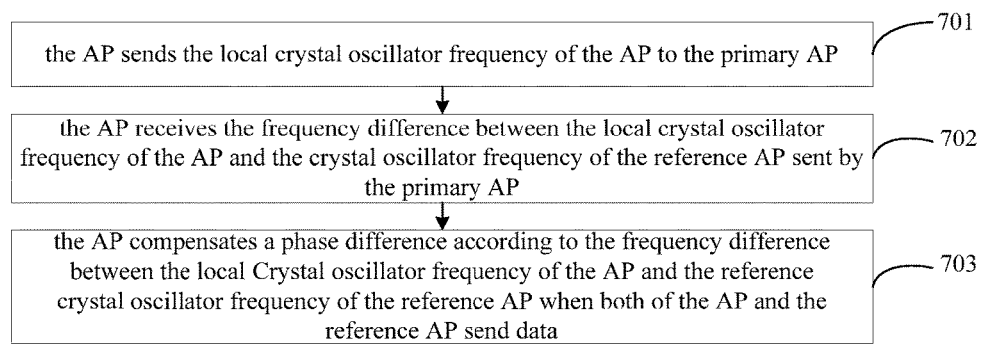
FIG. 7 is a schematic flow diagram of yet another transmission method provided in another embodiment of the present disclosure.

An embodiment of the present disclosure provides a transmission method applied to a cooperative transmission. The parameter value is a frequency difference between a crystal oscillator frequency of an AP and a crystal oscillator frequency of a reference AP. As shown in FIG. 7, the method includes the following steps:

An information transmission method provided in the present implementation is mainly applied to phase synchronization during a synchronization process of joint transmission, interference alignment and coordinated beamforming.

701. the AP sends the crystal oscillator frequency of the AP to the primary AP, so that the primary AP selects the crystal oscillator frequency of the reference AP and calculates the frequency difference between the crystal oscillator frequency of the AP and the crystal oscillator frequency of the reference AP according to the crystal oscillator frequency of the reference AP and the crystal oscillator frequency of the AP.

The primary AP is any of APs having a control function.

702. the AP receives the frequency difference between the crystal oscillator frequency of the AP and the crystal oscillator frequency of the reference AP sent by the primary AP.

703. the AP compensates a phase difference according to the frequency difference between the crystal oscillator frequency of the AP and the crystal oscillator frequency of the reference AP when both of the AP and the reference AP send data.

An interconnected wired network is mainly employed to implement synchronization of a phase in a phase synchronization method in the present embodiment.

The embodiment of the present disclosure may effectively offset or compensate phase difference of sending data caused by a crystal oscillator difference when data is sent and enable multiple sending ends to send data synchronously.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 8:
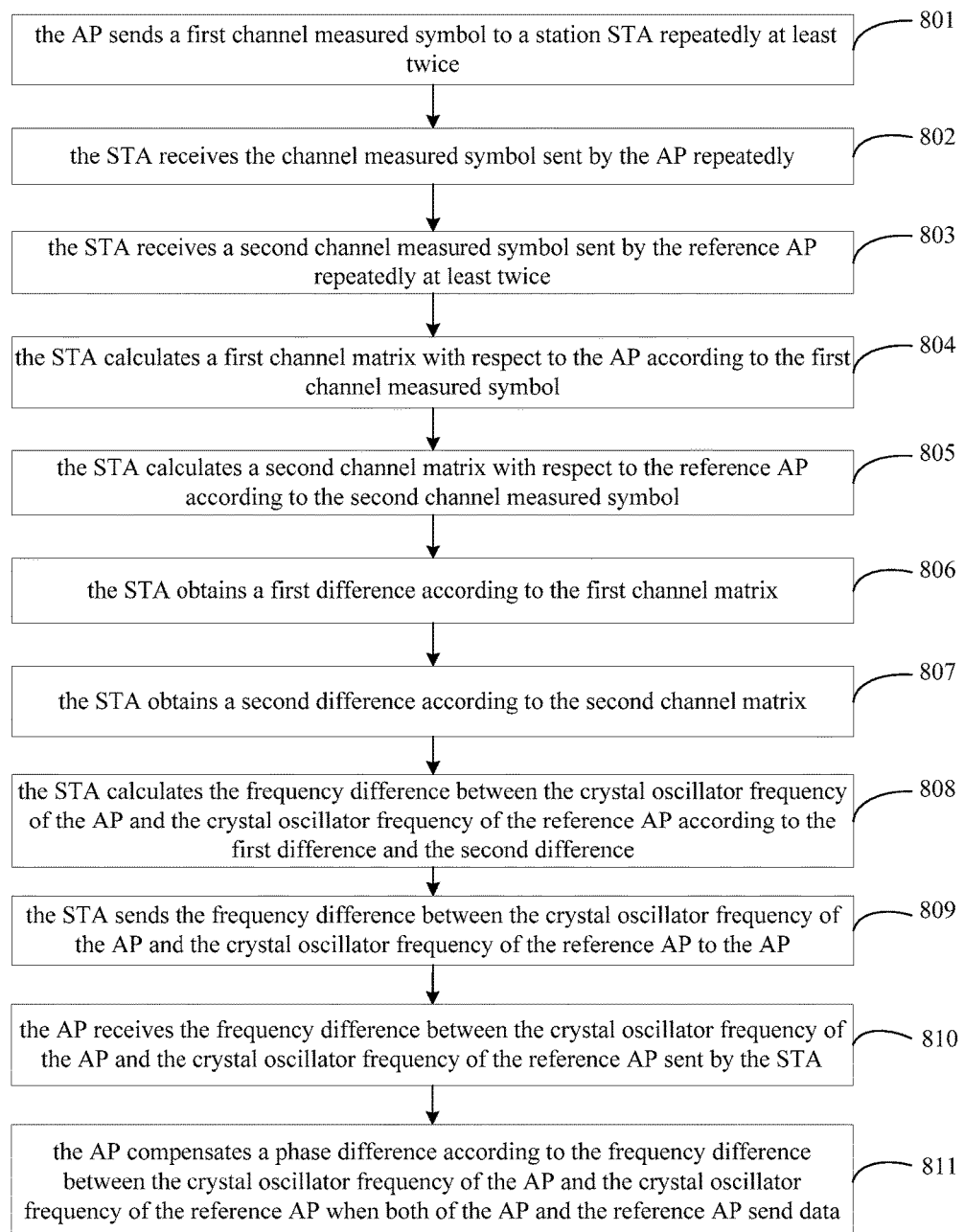
FIG. 8 is a schematic flow diagram of still another transmission method provided in another embodiment of the present disclosure.

An embodiment of the present disclosure provides a transmission method applied to a cooperative transmission. The parameter value is a frequency difference between a crystal oscillator frequency of an AP and a reference crystal oscillator frequency of a reference AP. As shown in FIG. 8, the method includes the following steps:

An information transmission method provided in the present implementation is mainly applied to phase synchronization during a synchronization process of joint transmission, interference alignment and coordinated beamforming. A phase synchronization method in the present embodiment is implemented through a wireless network.

801. the AP sends a first channel measured symbol to a station STA repeatedly at least twice, so that the STA calculates a first channel matrix with respect to the AP twice according to the first channel measured symbol and calculates the frequency difference between the crystal oscillator frequency of the AP and the crystal oscillator frequency of the reference AP according to the first channel matrix and a second channel matrix obtained.

Channel parameter matrixes of both the first channel matrix and the second channel matrix are unchanged, and the second channel matrix is a channel matrix with respect to the reference AP calculated by the STA according to a second channel measured symbol sent by the reference AP. A channel matrix is a phase difference caused by multiplying a channel parameter matrix by a frequency difference.

An interval between channel measured symbols sent twice may be $\Delta t = t_1 - t_0$, wherein $t_0$ is a time for initially sending a channel measured symbol, and $t_1$ is a time for sending a channel measured symbol for the second time.

Specifically, when a channel measured symbol is sent repeatedly twice, it may be sent continuously, or it may also be sent discontinuously, as long as it may be ensured that channel parameter matrixes $H_{mn}$ obtained from the two measurements are same.

802. the STA receives a first channel measured symbol sent by the AP repeatedly at least twice.

803. the STA receives a second channel measured symbol sent by the reference AP repeatedly at least twice.

804. the STA calculates a first channel matrix with respect to the AP according to the first channel measured symbol.

805. the STA calculates a second channel matrix with respect to the reference AP according to the second channel measured symbol.

Specifically, the STA calculates the first channel matrix with respect to the AP according to first channel measured symbols received twice. If the STA is $STA_0$ and the reference AP is $AP_0$, channel matrixes between them at a time t2 and a time t3 may be $H_{00}(t_2)$ and $H_{00}(t_3)$, respectively. A generally used formula of a channel matrix is $H_{mn}(t)=H_{mn}e^{j(w_{Tn}-w_{Rm})t}$, wherein $H_{mn}(t)$ is a channel matrix at time t from sending end n to receiving end m, $w_{Tn}$ is a crystal oscillator frequency of sending end n, and $w_{Rm}$ is a crystal oscillator frequency of receiving end m. In case, a detailed description that the STA calculates the second channel matrix with respect to the reference AP according to the second channel measured symbol twice is the same as the description that the STA calculates the first channel matrix with respect to the AP, which will not be repeated redundantly herein.

806. the STA obtains a first difference according to the first channel matrix.

The first difference is a frequency difference between a local crystal oscillator frequency and the crystal oscillator frequency of the AP.

807. the STA obtains a second difference according to the second channel matrix.

The second difference is a frequency difference between the local crystal oscillator frequency and the crystal oscillator frequency of the reference AP.

Taking $STA_0$ and $AP_0$ as an example, after obtaining channel matrix $H_{00}(t)$ affected by a frequency difference $(w_{T0}-w_{R0})$ between the local crystal oscillator frequency and the crystal oscillator frequency of the reference AP ($AP_0$) according to a channel estimation, the $STA_0$ obtains a current phase difference according to channel matrix $H_{00}(t_2)$ at t2 and channel matrix $H_{00}(t_3)$ at time t3: $H_{00}\ e^{j(w_{T0}-w_{R0})t_3}/H_{00}\ e^{j(w_{T0}-w_{R0})t_2}=e^{j(w_{T0}-w_{R0})(t_3-t_2)}=e^{j(w_{T0}-w_{R0})\Delta t}$, wherein $t_2$ is a time when a channel measured symbol is received for the first time, $t_3$ is a time when a channel measured symbol is received for the second time, $w_{T0}$ is a crystal oscillator frequency at which sending end $AP_0$ sends the channel measured symbol for the first time, and $w_{R0}$ is a crystal oscillator frequency at which receiving end $STA_0$ receives the channel measured symbol for the first time.

A frequency difference between the local crystal oscillator frequency and a crystal oscillator frequency of any of APs (APn) may be $(w_{Tn}-w_{R0})$. It should be noted that, for a detailed description of calculating the local crystal oscillator frequency and the crystal oscillator frequency of any of the APs according to the first channel matrix, please refer to an explanation of calculating the local crystal oscillator frequency and the crystal oscillator frequency of the reference AP according to the second channel matrix, which will not be repeated redundantly herein.

808. the STA calculates the frequency difference between the crystal oscillator frequency of the AP and the crystal oscillator frequency of the reference AP according to the first difference and the second difference.

Specifically, by subtracting the first difference from the second difference, i.e., subtracting a difference between $AP_0$ and $STA_0$ from a difference between APn and $STA_0$: subtracting $w_{T0}-w_{R0}$ from $w_{Tn}-w_{R0}$ frequency difference $w_{Tn}-w_{T0}$ between the crystal oscillator frequency of any of the APs (APn) and the crystal oscillator frequency of the reference AP ($AP_0$) may be obtained.

809. the STA sends the frequency difference between the crystal oscillator frequency of the AP and the crystal oscillator frequency of the reference AP to the AP.

810. the AP receives the frequency difference between the crystal oscillator frequency of the AP and the crystal oscillator frequency of the reference AP sent by the STA.

811. the AP compensates a phase difference according to the frequency difference between the crystal oscillator frequency of the AP and the crystal oscillator frequency of the reference AP when both of the AP and the reference AP send data.

Specifically, a method for compensating a phase difference may be that a reciprocal of the phase difference is multiplied by directly when data is sent, which is merely an example for illustrating the method for compensating a phase difference herein, and is not limited hereto. An appropriate method may be chosen in a specific application according to specific implementation environment. A channel measured symbol in the present embodiment may not be limited to a format of orthogonal frequency division multiplexing (Orthogonal Frequency Division Multiplexing, referred to as OFDM symbol), for example, it may include a null data packet+null data packet announcement (Null Data Packet+Null Data Packet Announcement, referred to as NDPA+NDP), or it may also include two general data frames.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 9:
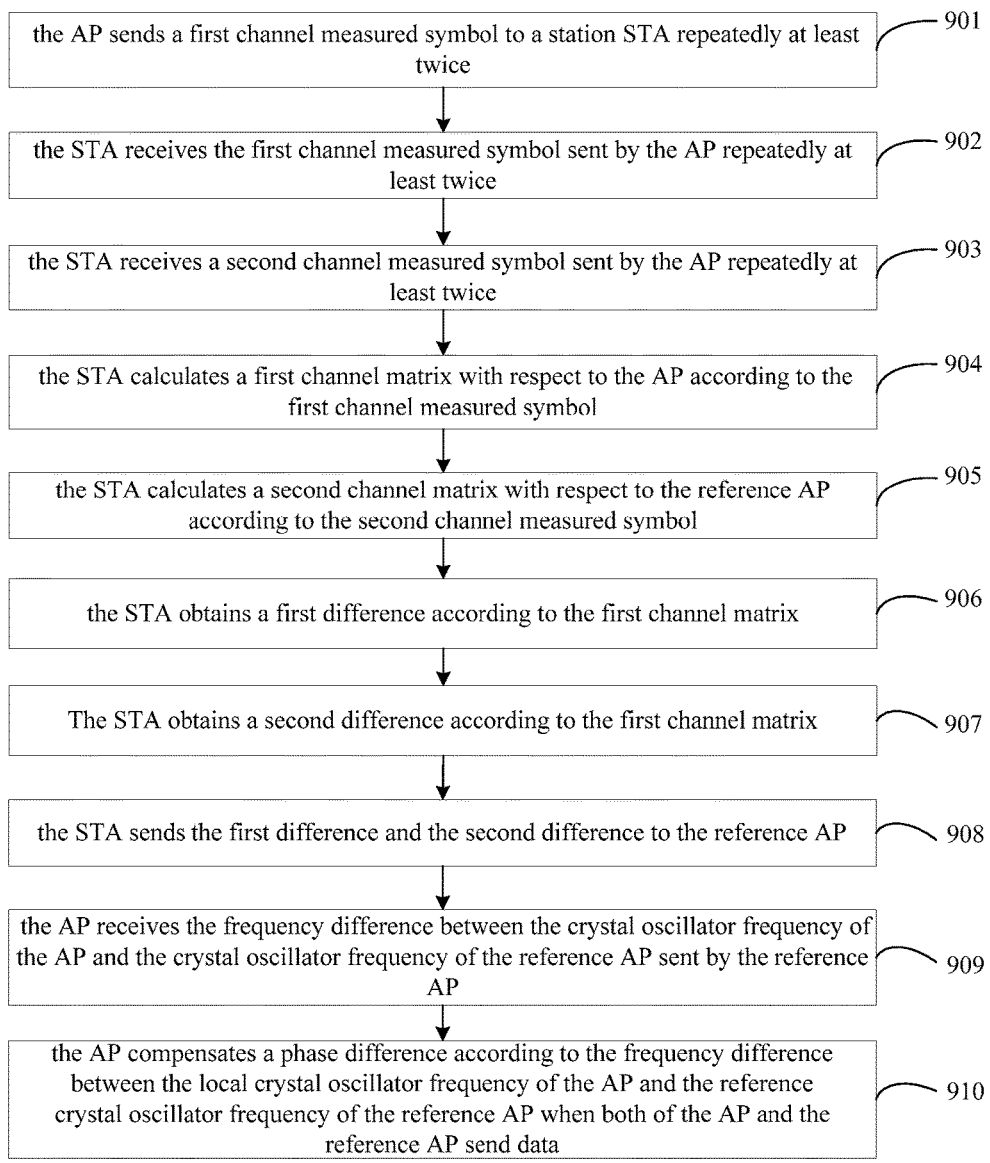
FIG. 9 is a schematic flow diagram of a transmission method provided in yet another embodiment of the present disclosure.

An embodiment of the present disclosure provides a transmission method applied to a cooperative transmission. The parameter value is a frequency difference between a crystal oscillator frequency of an AP and a crystal oscillator frequency of a reference AP. As shown in FIG. 9, the method includes the following steps:

An information transmission method provided in the present implementation is mainly applied to phase synchronization during a synchronization process of joint transmission, interference alignment and coordinated beamforming. A phase synchronization method in the present embodiment is implemented through a wireless network.

901. the AP sends a first channel measured symbol to an STA repeatedly at least twice, so that the STA and the reference AP calculate a first channel matrix with respect to the AP twice according to the first channel measured symbol and calculate the frequency difference between the crystal oscillator frequency of the AP and the crystal oscillator frequency of the reference AP according to the first channel matrix and a second channel matrix.

Channel parameter matrixes of both the first channel matrix and the second channel matrix are unchanged, and the second channel matrix is a channel matrix with respect to the reference AP calculated by the STA according to a second channel measured symbol sent by the reference AP.

902. the STA receives the first channel measured symbol sent by the AP repeatedly at least twice.

903. the STA receives a second channel measured symbol sent by the reference AP repeatedly at least twice.

904. the STA calculates a first channel matrix with respect to the AP according to the first channel measured symbol.

905. the STA calculates a second channel matrix with respect to the reference AP according to the second channel measured symbol.

906. the STA obtains a first difference according to the first channel matrix.

The first difference is a frequency difference between a local crystal oscillator frequency and the crystal oscillator frequency of the AP.

907. the STA obtains a second difference according to the second channel matrix.

The second difference is a frequency difference between the local crystal oscillator frequency and the crystal oscillator frequency of the reference AP.

908. the STA sends the first difference and the second difference to the reference AP, so that the reference AP calculates the frequency difference between the crystal oscillator frequency of the AP and the crystal oscillator frequency of the reference AP according to the first difference and the second difference, and sends the frequency difference between the crystal oscillator frequency of the AP and the crystal oscillator frequency of the reference AP to the AP.

909. the AP receives the frequency difference between the crystal oscillator frequency of the AP and the crystal oscillator frequency of the reference AP sent by the reference AP.

910. the AP compensates a phase difference according to the frequency difference between the crystal oscillator frequency of the AP and the crystal oscillator frequency of the reference AP when both of the AP and the reference AP send data.

A specific explanation of steps in the present embodiment is the same as that of same steps in the above-mentioned embodiments, which will not be repeated redundantly herein.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 10:
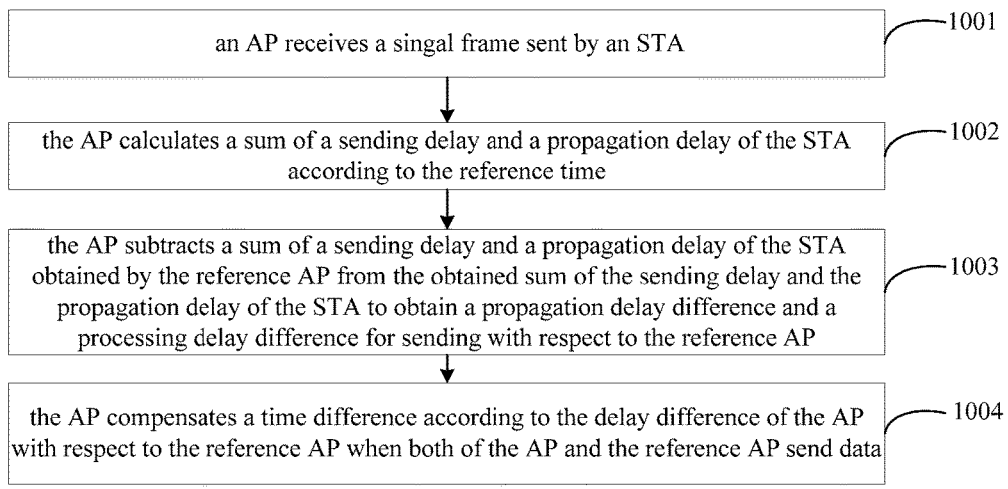
FIG. 10 is a schematic flow diagram of another transmission method provided in yet another embodiment of the present disclosure.

An embodiment of the present disclosure provides a transmission method applied to a cooperative transmission. The parameter value is a delay difference of the AP with respect to the reference AP. As shown in FIG. 10, the method includes the following steps:

An information transmission method provided in the present implementation is mainly applied to phase synchronization during a synchronization process of joint transmission, interference alignment and coordinated beamforming. Before implementation of the embodiment of the present disclosure, clocks between APs need to be synchronized through network interconnection. For example, 1588 standard of the Institute of Electrical and Electronic Engineers (Institute of Electrical and Electronic Engineers, referred to as IEEE) may be employed to reduce a synchronization error to 10 ns.

1001. an access point AP receives a signal frame sent by an STA.

The signal frame carries a reference time.

The signal frame is used to enable multiple APs to calculate a delay from that the STA sends it to that the AP receives it.

Specifically, the reference time may be a local time of the STA, or may also be a time value set simply and randomly.

Specifically, the delay includes three parts: sending end processing delay TX, channel propagation delay $T_D$ and receiving end processing delay $T_{RX}$. A total delay from reference STA, $STA_0$, at sending end to any of APs, APn, at receiving end is $T_{n0}=T_{TX,n}+T_{D,n0}+T_{RX,n0}$.

1002. the AP calculates a sum of a sending delay and a propagation delay of the STA according to the reference time.

Specifically, the sum of the sending delay of the STA and the propagation delay from the STA to the AP is obtained by subtracting the reference time in the signal frame and a processing delay for receiving of the AP from a local clock.

It is assumed that $AP_0$ is the reference AP, a sum of a sending delay and a propagation delay from $STA_0$ to $AP_0$ calculated by $AP_0$ is $T_{00}-T_{RX,0}=T_{TX,0}+T_{D,00}$; a sum of a sending delay and a propagation delay from $AP_0$ to APn calculated by APn is $T_{n0}-T_{RX,n}=T_{TX,0}+T_{D,n0}$.

1003. the AP subtracts a sum of a sending delay and a propagation delay of the STA obtained by the reference AP from the calculated sum of the sending delay and the propagation delay of the STA to obtain a propagation delay difference with respect to the reference AP and a processing delay difference for sending.

The sum of the sending delay and the propagation delay of the STA obtained by the reference AP is calculated by the reference AP according to the reference time and sent to the AP.

Specifically, a delay difference of the AP with respect to the reference AP may be obtained by subtracting the sum of the sending delay and the propagation delay obtained by the reference AP from the sum of the sending delay and the propagation delay obtained by the AP.

According to the sums of the sending delay and the propagation delay obtained by the AP and the reference AP in the above-mentioned steps, respectively, a propagation delay difference from the AP (APn) to $STA_0$ with respect to the reference AP ($AP_0$) is $T_{D,n0}-T_{D,00}=(T_{n0}-T_{RX,n})-(T_{00}-T_{RX,0})$.

Sending end processing delay $T_{TX}$ and receiving end processing delay $T_{RX}$ are affected by an implementation of a specific product and are various at different sending end or receiving end; however, as for a fixed sending end or receiving end, it is a definite value.

1004. the AP compensates a time difference according to the delay difference of the AP with respect to the reference AP when both of the AP and the reference AP send data.

Specifically, a method for compensating the time difference may be: the AP brings forward or delays a time of sending data with respect to the reference AP when data is sent.

As for different STAs, time differences between the AP and the reference AP are different. In the case that both of the AP and the reference AP serve multiple STAs, the AP may obtain a time difference with respect to the multiple STAs. For a specific compensation of time difference, it may be considered that a time compensation amount is figured out collectively for each AP in the case that an orthogonal frequency division multiplexing (Orthogonal Frequency Division Multiplexing, referred to as OFDM) symbol is constrained by a cyclic prefix (Cyclic Prefix, referred to as CP) length and let all delays from the AP to all STAs be less than a CP length adopted in a sending signal.

Taking n APs (wherein $AP_0$ is the reference AP) and m STAs as an example, assuming that the CP length is $T_{cp}$, a delay and delay difference after compensation need to satisfy the in equation below:

$$T_{D,mn}<T_{cp}, T_{D,mn}-T_{D,mn'}<T_{cp}, n \neq n'$$

wherein $T_{D,mn}$ and $T_{D,mn'}$ are propagation delays for different channels.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 11:
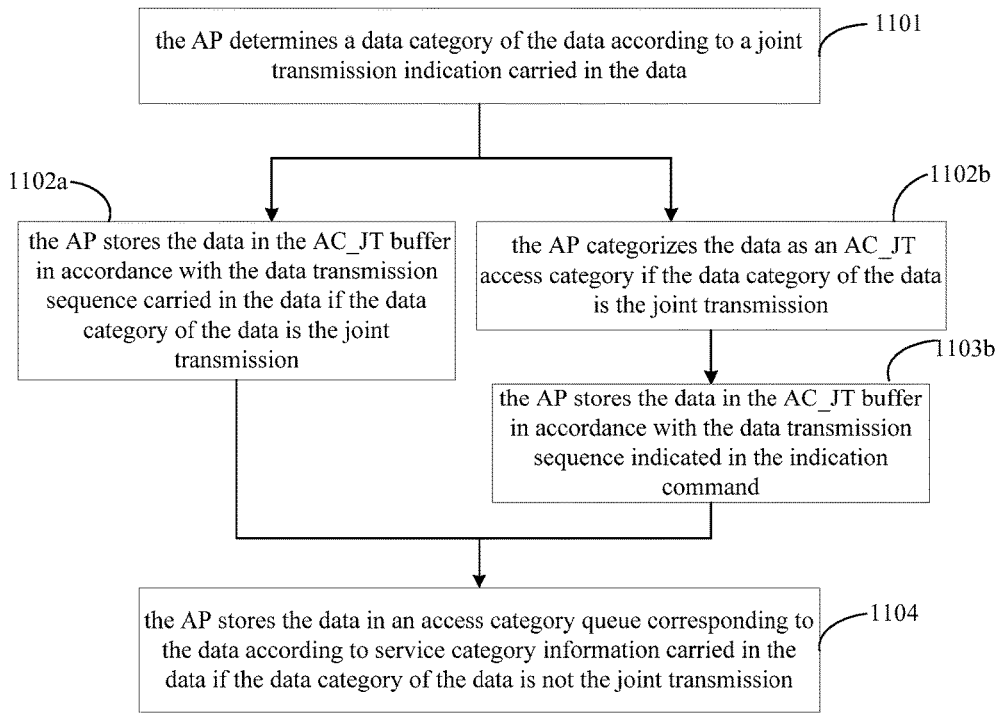
FIG. 11 is a schematic flow diagram of yet another transmission method provided in yet another embodiment of the present disclosure.

An embodiment of the present disclosure provides a transmission method applied to a cooperative transmission. The buffer is an access category joint transmission (Access Category Joint Transmission, referred to as AC_JT) buffer. As shown in FIG. 11, the method includes the following steps:

An information transmission method provided in the present embodiment is mainly applied to a process of data sharing during a joint transmission process. In the present embodiment, a controller of a primary AP or AP will attach a label of joint transmission for data that needs to be jointly transmitted and an order needs to be followed during joint transmission of the data in advance, and share the data with other APs participating in the joint transmission through a wired network.

1101. the AP determines a data category of the data according to a joint transmission_indication (Joint Transmission_Indication, referred to as JT_IDX) carried in the data.

1102a. the AP stores the data in the AC_JT buffer in accordance with the data transmission order carried in the data if the data category of the data is the joint transmission.

1102b. the AP categories the data as an AC_JT access category if the data category of the data is the joint transmission.

1103b. the AP stores the data in the AC_JT buffer in accordance with the data transmission order indicated in the indication command.

The indication command is carried in the data.

The following steps are executed after step 1102a and 1103b.

1104. the AP stores the data in an access category queue corresponding to the data according to service category information carried in the data if the data category of the data is not the joint transmission.

An access category queue corresponding to the data not for the joint transmission may be an access category voice (Access Category Voice, referred to as AC_VO), an access category video (Access Category Video, referred to as AC_VI), an access category best effort (Access Category best effort, referred to as AC_BE) or an access category background (Access Category background, referred to as AC_BK).

An enhanced distributed channel access function (Enhanced Distributed Channel Access Function, referred to as EDCAF) of an AC_JT category buffer has the highest priority. However, the buffer needs to be activated only if it is used for joint transmission. Data in the present embodiment is from a layer over a media access control (Media Access Control, referred to as MAC) layer.

Figure 12:
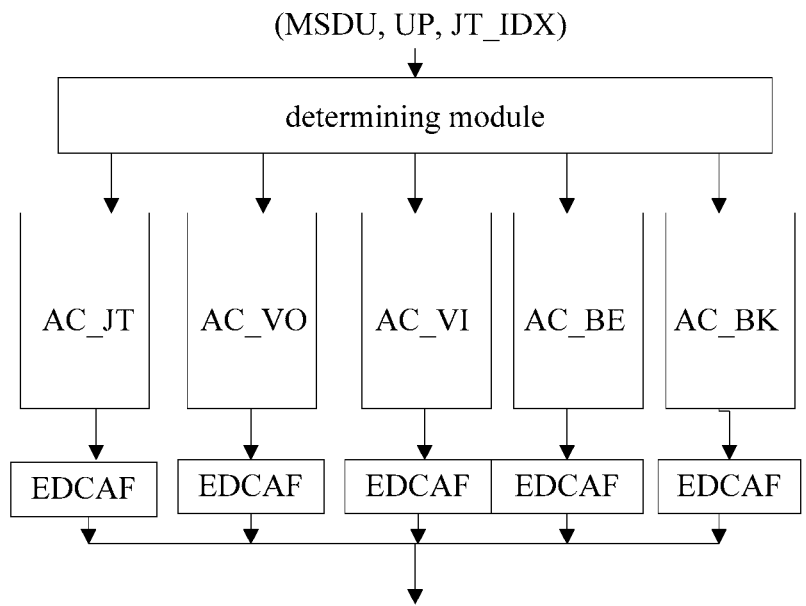
FIG. 12 is a schematic diagram of a structure of an enhanced distributed channel access which supports joint transmission provided in an embodiment of the present disclosure.
Figure 13:
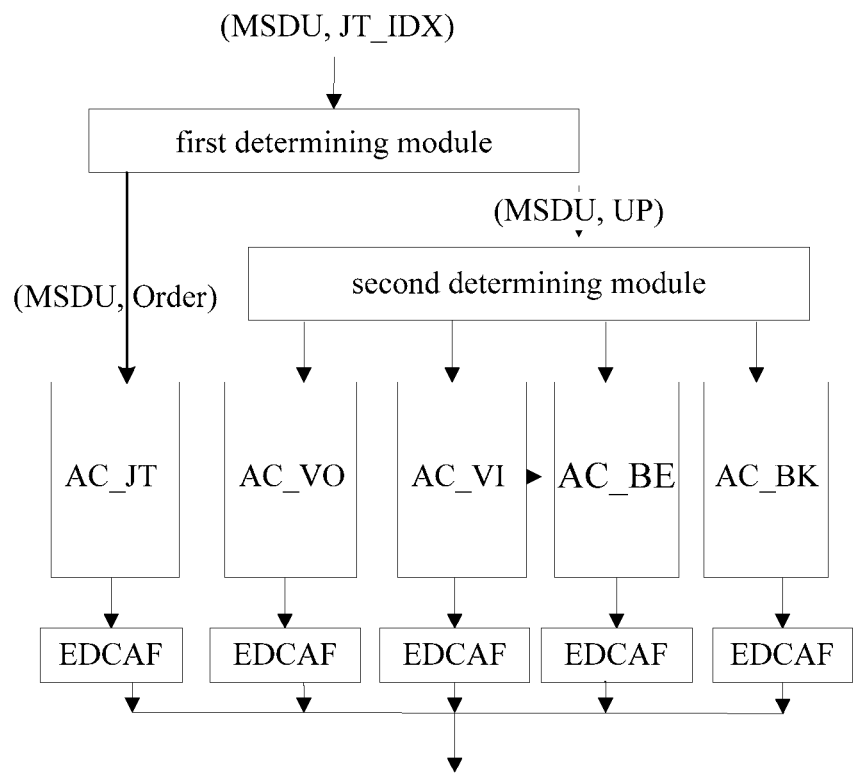
FIG. 13 is a schematic diagram of a structure of another enhanced distributed channel access which supports joint transmission provided in an embodiment of the present disclosure.

The present embodiment illustrates an EDCA structure which supports the joint transmission and when data is sent with a design based on an access mechanism (Enhanced Distributed Channel Access, referred to as EDCA). If step 1102a is executed, the EDCA structure is shown in FIG. 12; a joint transmission indication JT_IDX, an MAC service data unit (Media Access Control service Data Unit, referred to as MSDU) and a user priority (user priority, referred to as UP) are in a same module. If steps 1102b and 1103b are executed, a corresponding EDCA structure is shown in FIG. 13; an MSDU and a JT_IDX are used to indicate a first determining module and send first indication information, and the MSDU and a UP are used to indicate a second determining module.

Specifically, buffers in the present embodiment all belong to a queue and is a first in first out structure, i.e., data which first enters into the queue is first output from the queue.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 14:
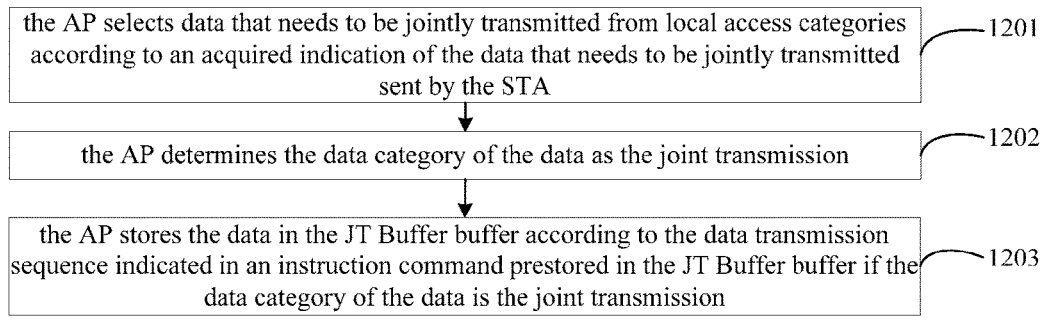
FIG. 14 is a schematic flow diagram of yet another transmission method provided in yet another embodiment of the present disclosure.

An embodiment of the present disclosure provides a transmission method applied to a cooperative transmission. The buffer is a joint transmission buffer (Joint Transmission Buffer, referred to as JT Buffer). As shown in FIG. 14, the method includes the following steps:

An information transmission method provided in present implementation is mainly applied to a process of data sharing during a joint transmission process. In the present implementation, a controller of a primary AP or AP will attach a label of joint transmission for data that needs to be transmitted and a order needs to be followed during joint transmission of the data in advance.

1201. the AP selects data that needs be jointly transmitted from a local access category according to an obtained indication of the data that needs to be jointly transmitted sent by the STA.

The local access category includes an access category voice AC_VO, an access category video AC_VI, an access category best effort AC_BE or an access category background AC_BK.

1202. the AP determines the data category of the data as the joint transmission.

1203. the AP stores the data in the JT Buffer buffer according to the data transmission order indicated in an instruction command prestored in the JT Buffer buffer if the data category of the data is the joint transmission.

Specifically, the instruction command is stored in the JT Buffer buffer by the AP.

An EDCAF of an AC_JT category buffer has the highest priority. However, the buffer needs to be activated only if it is used for the joint transmission.

Buffers in the present embodiment all belong to a queue and are a first in first out structure, i.e., data which first enters into the queue is first output from the queue.

Figure 15:
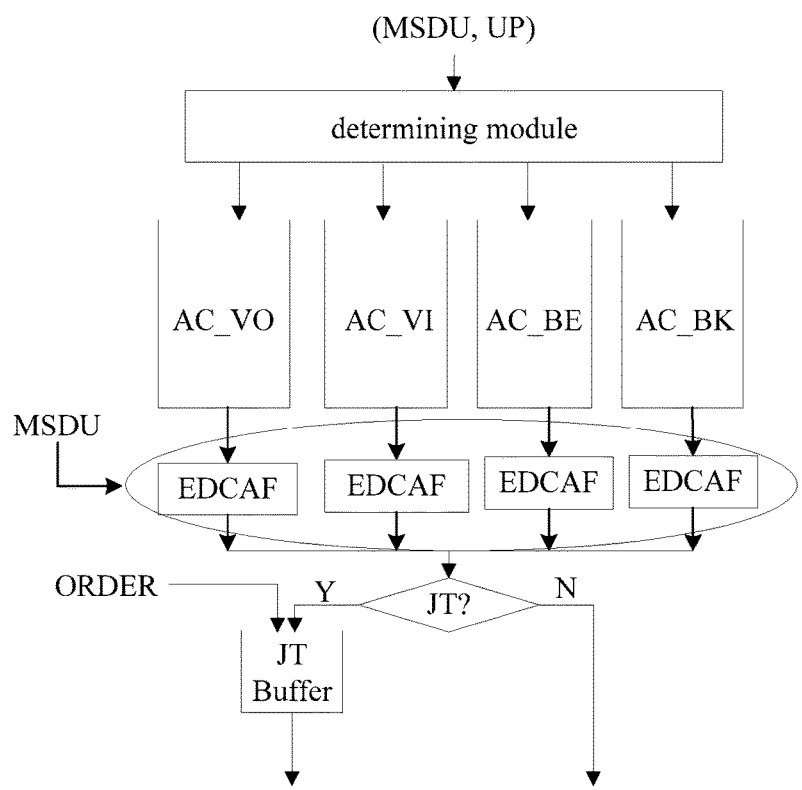
FIG. 15 is a schematic diagram of a structure of yet another enhanced distributed channel access which supports joint transmission provided in an embodiment of the present disclosure.

The present embodiment illustrates an EDCA structure which supports joint transmission and when data is sent with a design based on an access mechanism (Enhanced Distributed Channel Access, referred to as EDCA) and the EDCA structure is shown in FIG. 15.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 16:
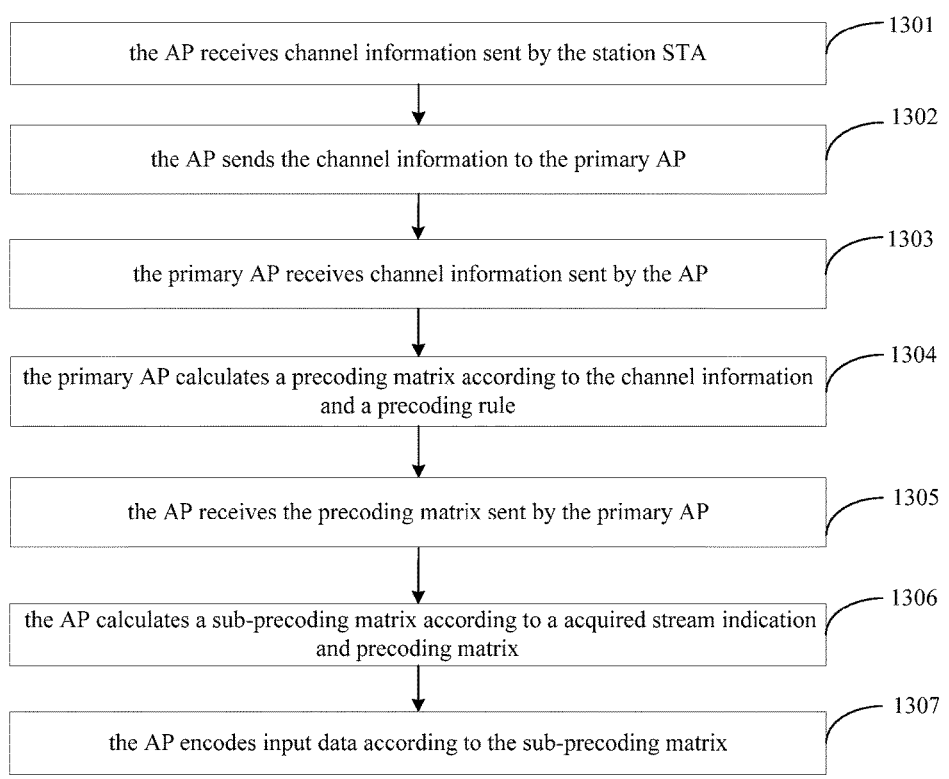
FIG. 16 is a schematic flow diagram of a transmission method provided in yet another embodiment of the present disclosure.

An embodiment of the present disclosure provides a transmission method applied to a cooperative transmission. As shown in FIG. 16, the method includes the following steps:

An information transmission method provided in the present embodiment is mainly applied to a process of obtaining channel information during a process of joint transmission, interference alignment and coordinated beamforming. An AP and an STA are grouped according to a certain rule before an implementation of the present embodiment, and any of APs communicating with a primary AP is in the same group with the primary AP in the present embodiment.

1301. the AP receives channel information sent by the station STA.

1302. the AP sends the channel information to the primary AP, so that the primary AP calculates a precoding matrix according to the channel information and a precoding rule and sends it to the AP through indication information.

The indication information carries the precoding matrix and a stream indication corresponding to each AP, and the stream indication is used for indicating a part of the precoding matrix used by each AP and a corresponding number of streams. The indication information may be sent by the primary AP in a form of broadcasting information, or may also be sent by the primary AP to all APs one by one.

1303. the primary AP receives channel information sent by the AP.

1304. the primary AP calculates a precoding matrix according to the channel information and a precoding rule.

The calculating of precoding matrix in the present embodiment may be that the precoding matrix is calculated according to stream indication information carried in the channel information and the precoding rule, and specifically it may be that the precoding matrix may be calculated according to a part of the precoding matrix used by each AP and a corresponding number of streams indicated by the stream indication information. Certainly it may also be that the primary AP may be that the primary AP splits the precoding matrix according to a corresponding relationship between the precoding matrix and any of APs and then sends the split precoding matrix to a corresponding AP.

1305. the AP receives the precoding matrix sent by the primary AP.

1306. the AP calculates a sub-precoding matrix according to the obtained stream indication and precoding matrix.

The stream indication carries a sub-matrix of the sub-precoding matrix.

Specifically, the stream indication information carries a relationship between the precoding matrix and a sub-precoding matrix of a corresponding AP. According to the stream indication information, it may be determined which part of the sub-precoding matrix needs to be changed according to the precoding matrix, columns of the sub-precoding matrix may be determined according to number of spatial streams, number of rows of the sub-precoding matrix is the same as that of the precoding matrix, and zero-padding is performed at other positions of the sub-precoding matrix except that a corresponding position is the same as that of the precoding matrix.

In the present embodiment, the AP determines the number of channel encoders and the number of spatial streams according to specification of joint transmission, wherein the APs are required to have the same number of encoders, and the number of spatial streams is used to determine the number of columns of the sub-precoding matrix.

1307. the AP encodes input data according to the sub-precoding matrix.

Each AP makes adjustment to the precoding matrix according to the stream indication after obtaining a shared precoding matrix. For join transmission (JT), it is required that processing dimensionalities of all modules before a spatial mapping (Spatial Mapping) module are processed in accordance with a dimensionality of the join transmission.

Taking joint transmission performed by N APs as an example for illustration, if number of space-time streams that may be supported by APn is $K_n$, $$\sum_{n=1}^{N} K_n$$

space-time streams may be totally supported during the joint transmission. However, it is required that modules before the spatial mapping of each AP is implemented in accordance with a dimensionality with number of space-time streams of $$\sum_{n=1}^{N} K_n.$$

A stream parser (Stream Parser) of each AP is not only same and synchronous, but also has to be capable of dividing $$\sum_{n=1}^{N} K_n$$

spatial streams in the case of joint transmission performed by N APs.

Assume that a ratio of the spatial stream to the space-time stream is d, X is an input signal of space mapping (dimension:

$$d\sum_{n=1}^{N} K_n * 1 \Bigg),$$

and P is a precoding matrix (dimension:

$$\sum_{n=1}^{N} L_n * d \sum_{n=1}^{N} K_n,$$

wherein $L_n$ is the number of transmission antennas of APn). Thus, precoding of APn should select a position corresponding to the AP in P matrix $$\left( P\left[ \left( \sum_{i=1}^{n-1} L_i + 1, \ldots, \sum_{i=1}^{n} L_i \right) \times \left( 1, \ldots, d\sum_{i=1}^{N} K_i \right) \right] \right),$$

stream indication) and a dimension $$\left(L_n^* d \sum_{n=1}^{N} K_n\right).$$

Since APn has $$d \sum_{n=1}^{N} K_n$$

space-time streams in total, and the number of transmission antennas is only $L_n$, zero-padding needs to be performed on other lines of P except $dK_n$. Taking two APs and that each AP has two space-time streams as an example, a precoding matrix of joint transmission is P, wherein the P may be written as $$P = \begin{bmatrix} P_{11} & P_{12} & P_{13} & P_{14} \\ P_{21} & P_{22} & P_{23} & P_{24} \\ P_{31} & P_{32} & P_{33} & P_{34} \\ P_{41} & P_{42} & P_{43} & P_{44} \end{bmatrix}.$$

As for $AP_1$, according to principle of obtaining sub-precoding matrix in the present embodiment, it may be obtained that a precoding matrix of $AP_1$ is $$P_1 = \begin{bmatrix} P_{11} & P_{12} & P_{13} & P_{14} \\ P_{21} & P_{22} & P_{23} & P_{24} \\ 0 & 0 & 0 & 0 \\ 0 & 0 & 0 & 0 \end{bmatrix};$$

as for $AP_2$, according to the principle of obtaining sub-precoding matrix in the present embodiment, it may be obtained that a precoding matrix of $AP_2$ is $$P_2 = \begin{bmatrix} 0 & 0 & 0 & 0 \\ 0 & 0 & 0 & 0 \\ P_{31} & P_{32} & P_{33} & P_{34} \\ P_{41} & P_{42} & P_{43} & P_{44} \end{bmatrix}.$$

Figure 17:
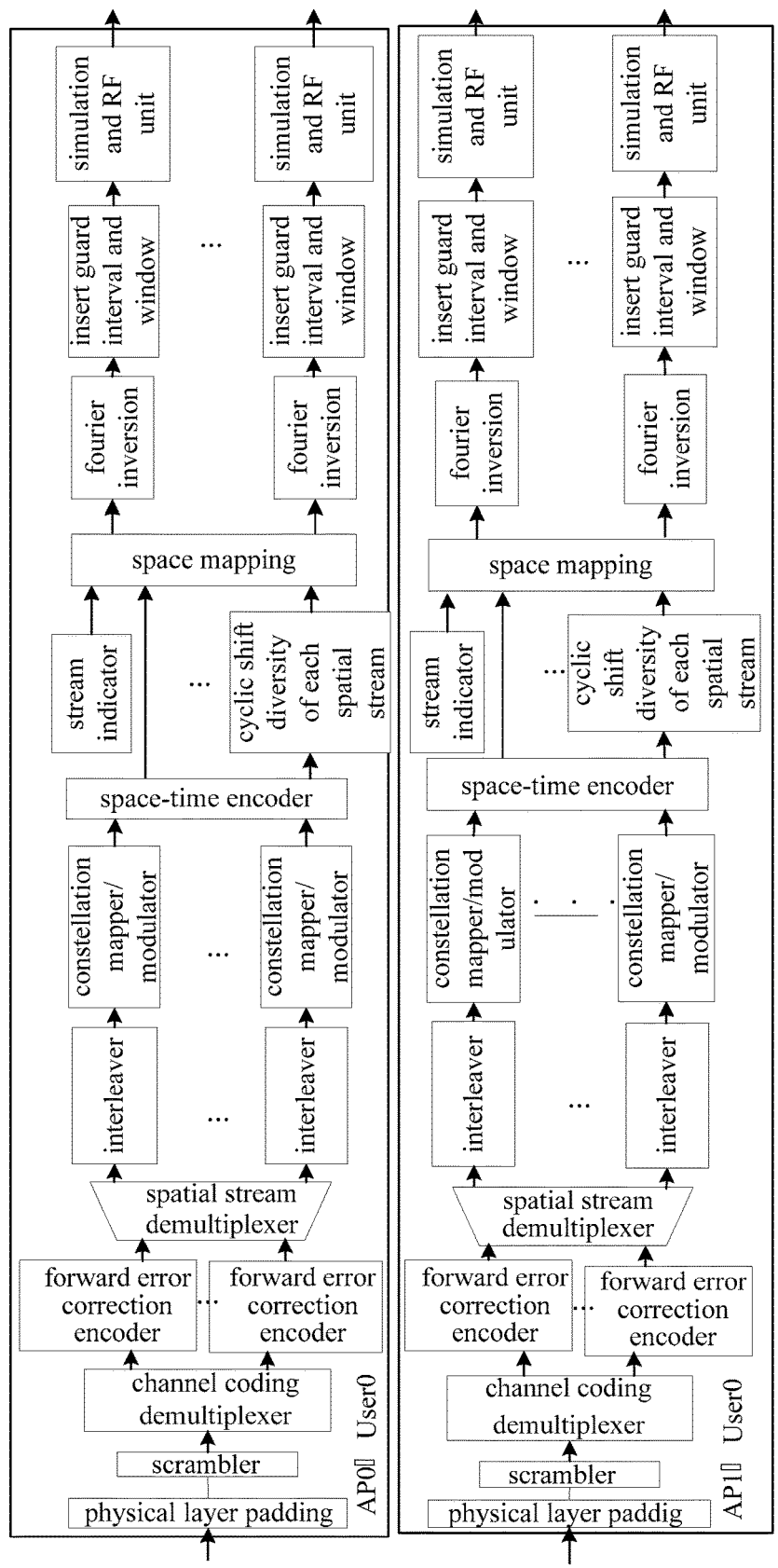
FIG. 17 is a block diagram of a transmitter applied to two APs for cooperative transmission in an embodiment of the present disclosure.

Specifically, as shown in FIG. 17, two APs are taken as an example for illustrating a block diagram of a transmitter in the case of a cooperative transmission. After obtaining shared precoding matrix, each AP adjusts the precoding matrix in accordance with a stream indication. Processing dimensions of all modules before a space mapping module need to be processed in accordance with a dimension of joint transmission in the case of the joint transmission.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data transmission in an actual network is provided, which reduces overhead and improves work efficiency. Meanwhile, application scenarios may also be extended.

Figure 18:
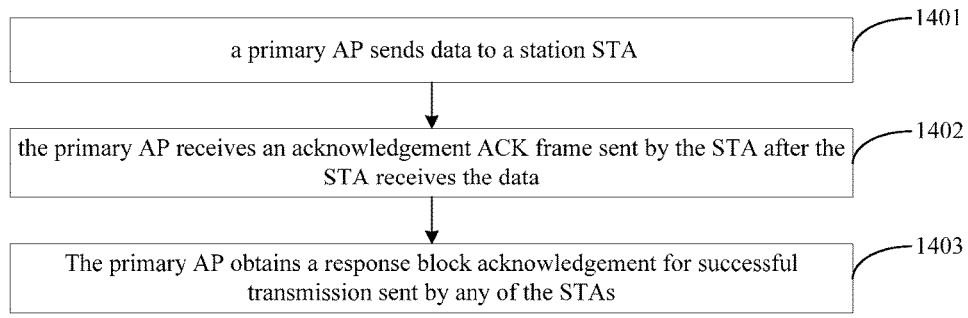
FIG. 18 is a schematic flow diagram of another transmission method provided in yet another embodiment of the present disclosure.

An embodiment of the present disclosure provides a transmission method applied to a cooperative transmission. As shown in FIG. 18, the method includes the following steps:

An information transmission method provided in the present implementation is mainly applied to a process of obtaining channel information during a process of joint transmission, interference alignment and coordinated beamforming.

1401. a primary AP sends data to a station STA.

The data may indicate all APs and STAs participating in the cooperative transmission.

1402. the primary AP receives an acknowledgement ACK frame sent by the STA after the STA receives the data, so that any of the APs participating in the cooperative transmission determines its own data transmission time, so as to avoid occurrence of a conflict.

The ACK frame carries all the APs and STAs participating in the cooperative transmission.

1403. the primary AP obtains a response block acknowledgement (Block ACK, referred to as BA) for successful transmission sent by any of the STAs.

Figure 19:
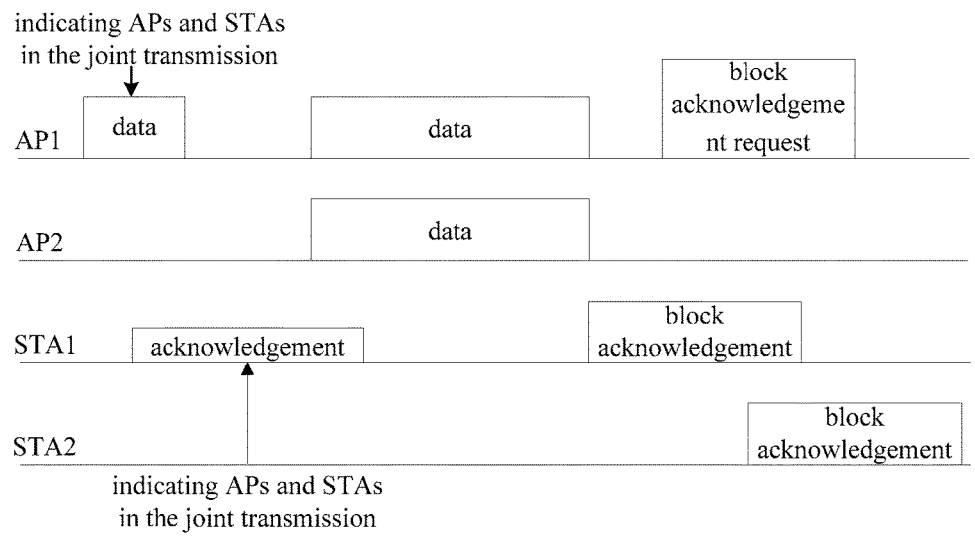
FIG. 19 is a schematic flow diagram of a data transmission process provided in an embodiment of the present disclosure.

Specifically, as shown in FIG. 19, the present embodiment gives a schematic diagram which illustrates a data transmission process by taking two APs and two STAs as an example.

In the present embodiment, by the data transmission between an AP and an STA, any of APs participating in a cooperative transmission may learn that it should start participating in the cooperative transmission from a fixed time during the following process of collectively transmitting data through data sent by the AP and the acknowledgement frame replied by the STA in the present embodiment. The fixed time may be a short interframe space (Short Interframe Space, referred to as SIFS) or a point coordination function interframe space (Point Coordination Function Interframe Space, referred to as PIFS). Certainly the fixed time is not limited hereto, it is only an example for illustration herein and an appropriate duration may be selected according to specific implementation environment.

The PIFS is an interframe space specified in an existing wireless local area network standard. For example, a duration specified in IEEE 802.11b is 30 us microsecond, and a slot time is 20 us; a duration specified in IEEE 802.11a is 25 us and a slot time is 9 us; and a duration specified in IEEE 802.11g is 19 us or 30 us and a slot time is 9 us or 20 us. A duration of PIFS equals a duration of SIFS plus a duration of a slot time Slot time.

The SIFS is a fixed value in an existing wireless local area network. For example, a duration specified in IEEE 802.11b is 10 us, a duration specified in IEEE 802.11a is 16 us and a duration specified in IEEE 802.11g is 10 us.

Specifically, the primary AP in APs may inform all APs participating in the cooperative transmission of adjustment to synchronous transmission through signalling or data exchange of an air interface at an initial stage for initiating data transmission, or it may also be implemented through an interconnected wired network.

The transmitted data may be a request to send (Request To Send, referred to as RTS) frame, and then the STA replies a clear to send (clear to send, referred to as CTS) frame. Certainly the transmitted data may also be a notice for starting a cooperative transmission, and then the STA needs to reply a specific frame.

According to the transmission method and device provided in the embodiments of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 20:
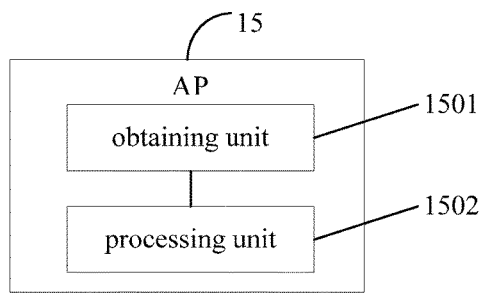
FIG. 20 is a schematic diagram of a structure of an AP provided in an embodiment of the present disclosure.

An embodiment of the present disclosure provides an AP15 applied to a cooperative transmission. As shown in FIG. 20, it includes a receiving unit 1501 and a processing unit 1502.

The obtaining unit 1501 is configured to obtain a parameter value.

The parameter value is a frequency difference between a crystal oscillator frequency of the AP and a reference crystal oscillator frequency of a reference AP, or a delay difference of the AP with respect to the reference AP.

The processing unit 1502 is configured to compensate a phase difference or a time difference according to the parameter value when both of the AP and the reference AP send data.

Figure 21:
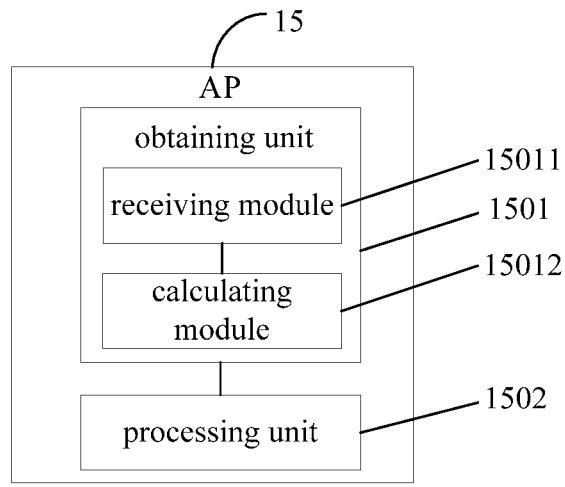
FIG. 21 is a schematic diagram of a structure of another AP provided in an embodiment of the present disclosure.

Further, the parameter value is a frequency difference between the crystal oscillator frequency of the AP and the crystal oscillator frequency of the reference AP. As shown in FIG. 21, the obtaining unit 1501 includes a receiving module 15011 and a calculating module 15012.

The receiving module 15011 is configured to receive the crystal oscillator frequency of the reference AP sent by a primary AP.

The primary AP is any of APs having a control function.

The calculating module 15012 is configured to calculate the frequency difference between the crystal oscillator frequency of the AP and the crystal oscillator frequency of the reference AP according to the crystal oscillator frequency of the reference AP.

Figure 22:
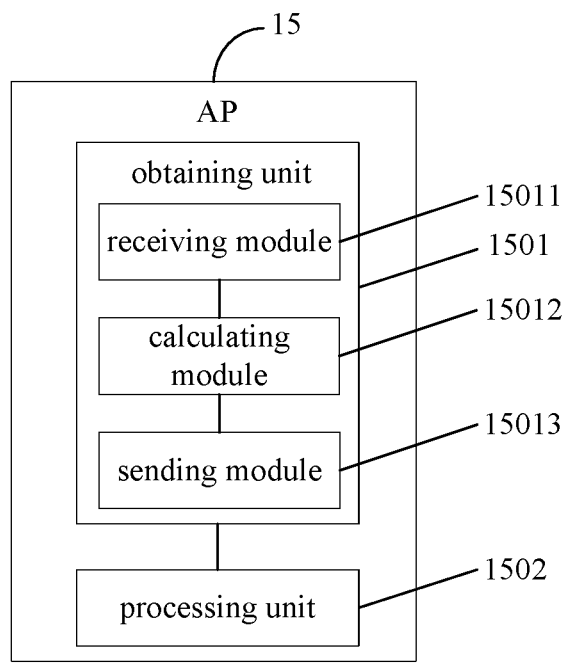
FIG. 22 is a schematic diagram of a structure of yet another AP provided in an embodiment of the present disclosure.

Further, the parameter value is a frequency difference between the crystal oscillator frequency of the AP and the crystal oscillator frequency of the reference AP. As shown in FIG. 22, the obtaining unit 1501 further includes a sending module 15013.

The sending module 15013 is configured to send the crystal oscillator frequency of the AP to the primary AP, so that the primary AP selects the crystal oscillator frequency of the reference AP and calculates the frequency difference between the crystal oscillator frequency of the AP and the crystal oscillator frequency of the reference AP according to the crystal oscillator frequency of the reference AP and the crystal oscillator frequency of the AP.

The receiving module 15011 is further configured to receive the frequency difference between the crystal oscillator frequency of the AP and a reference crystal oscillator frequency of the reference AP sent by the primary AP.

Further, the parameter value is a frequency difference between the crystal oscillator frequency of the AP and the crystal oscillator frequency of the reference AP.

The sending module 15013 is further configured to send a first channel measured symbol to an STA repeatedly at least twice, so that the STA calculates a first channel matrix with respect to the AP twice according to the first channel measured symbol and calculates the frequency difference between the crystal oscillator frequency of the AP and the crystal oscillator frequency of the reference AP according to the first channel matrix and a second channel matrix obtained.

Channel parameter matrixes of both the first channel matrix and the second channel matrix are unchanged, and the second channel matrix is a channel matrix with respect to the reference AP calculated by the STA according to a second channel measured symbol sent by the reference AP.

The receiving module 15011 is further configured to receive the frequency difference between the crystal oscillator frequency of the AP and the crystal oscillator frequency of the reference AP sent by the station STA.

Further, the parameter value is a frequency difference between the crystal oscillator frequency of the AP and the crystal oscillator frequency of the reference AP.

The sending module 15013 is further configured to send a first channel measured symbol to a station STA repeatedly at least twice, so that the STA and the reference AP calculate a first channel matrix with respect to the AP twice according to the first channel measured symbol and calculate the frequency difference between the crystal oscillator frequency of the AP and the crystal oscillator frequency of the reference AP according to the first channel matrix and a second channel matrix.

Channel parameter matrixes of both the first channel matrix and the second channel matrix are unchanged, and the second channel matrix is a channel matrix with respect to the reference AP calculated by the STA according to a second channel measured symbol sent by the reference AP.

The receiving module 15011 is further configured to receive the frequency difference between the crystal oscillator frequency of the AP and the crystal oscillator frequency of the reference AP sent by the reference AP.

Figure 23:
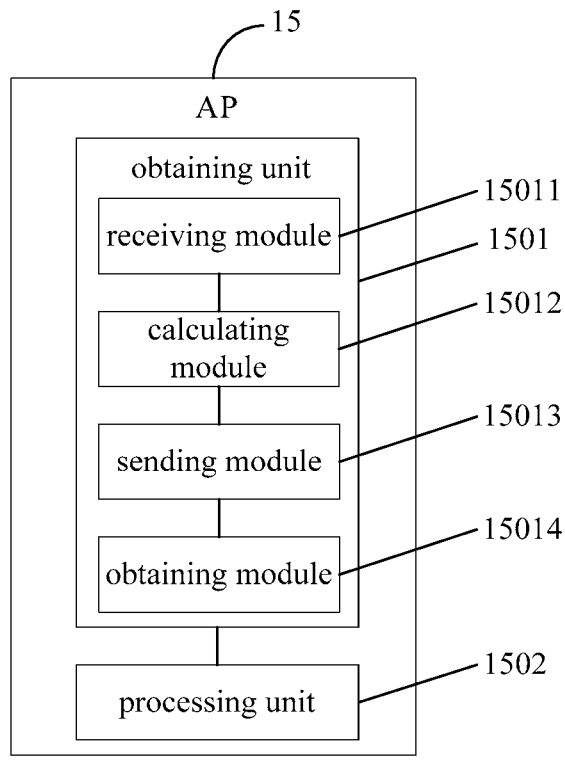
FIG. 23 is a schematic diagram of a structure of still another AP provided in an embodiment of the present disclosure.

Further, as shown in FIG. 23, the parameter value is a delay difference of the AP with respect to the reference AP, and the obtaining unit 1501 further includes an obtaining module 15014.

The receiving module 15011 is further configured to receive a signal frame sent by an STA.

The signal frame carries a reference time.

The calculating module 15012 is further configured to calculate a sum of a sending delay and a propagation delay of the STA according to the reference time.

The obtaining module 15014 is configured to subtract a sum of a sending delay and a propagation delay of the STA obtained by the reference AP from the calculated sum of the sending delay and the propagation delay of the STA to obtain a propagation delay difference and a processing delay difference for sending with respect to the reference AP.

The sum of the sending delay and the propagation delay of the STA obtained by the reference AP is calculated by the reference AP according to the reference time and sent to the AP.

According to the AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 24:
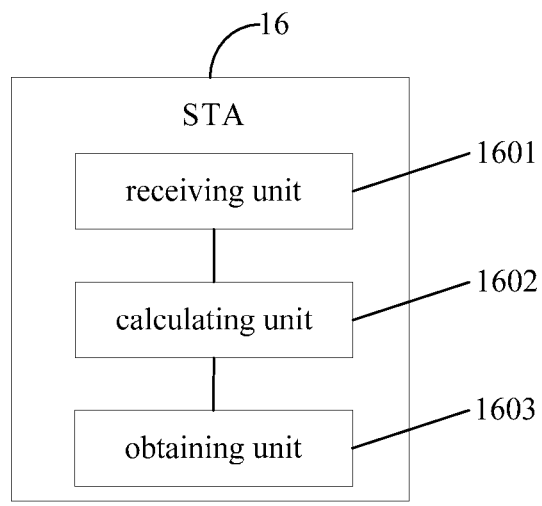
FIG. 24 is a schematic diagram of a structure of an STA provided in an embodiment of the present disclosure.

An embodiment of the present disclosure provides an STA16 applied to a cooperative transmission. As shown in FIG. 24, it includes a receiving unit 1601, a calculating unit 1602 and an obtaining unit 1603.

The receiving unit 1601 is configured to receive a first channel measured symbol sent by an access point AP repeatedly at least twice.

The receiving unit 1601 is further configured to receive a second channel measured symbol sent by a reference AP repeatedly at least twice.

The calculating unit 1602 is configured to calculate a first channel matrix with respect to the AP according to the first channel measured symbol.

The calculating unit 1602 is further configured to calculate a second channel matrix with respect to the reference AP according to the second channel measured symbol.

The obtaining unit 1603 is configured to calculate a frequency difference between a crystal oscillator frequency of the AP and a crystal oscillator frequency of the reference AP according to the first channel matrix and the second channel matrix.

Figure 25:
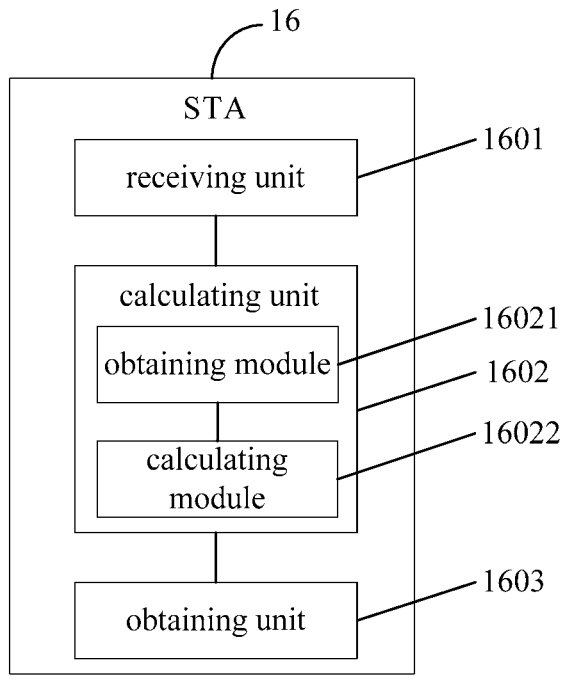
FIG. 25 is a schematic diagram of a structure of another STA provided in an embodiment of the present disclosure.

Further, as shown in FIG. 25, the calculating unit 1602 includes an obtaining module 16021 and a calculating module 16022.

The obtaining module 16021 is configured to obtain a first difference according to a first channel matrix.

The first difference is a frequency difference between a local crystal oscillator frequency and the crystal oscillator frequency of the AP.

The obtaining module 16021 is further configured to obtain a second difference according to a second channel matrix.

The second difference is a frequency difference between the local crystal oscillator frequency and the crystal oscillator frequency of the reference AP.

The calculating module 16022 is configured to calculate the frequency difference between the crystal oscillator frequency of the AP and the crystal oscillator frequency of the reference AP according to the first difference and the second difference.

Figure 26:
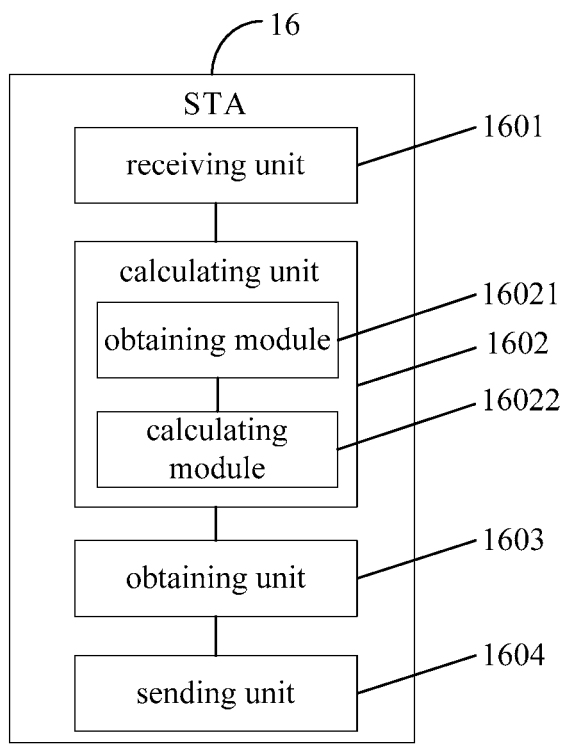
FIG. 26 is a schematic diagram of a structure of yet another STA provided in an embodiment of the present disclosure.

Further, as shown in FIG. 26, the STA further includes a sending unit 1604.

The sending unit 1604 is configured to send the frequency difference between the crystal oscillator frequency of the AP and the crystal oscillator frequency of the reference AP to the AP.

Figure 27:
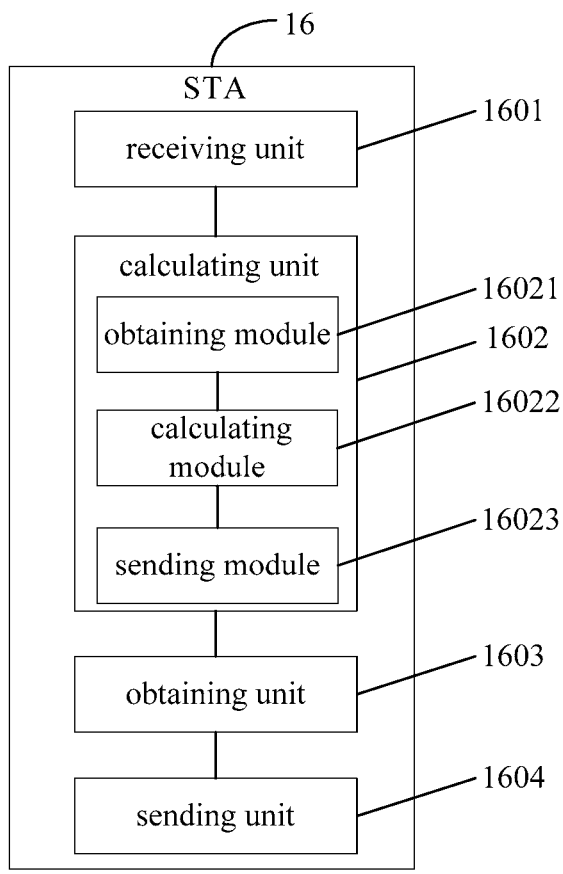
FIG. 27 is a schematic diagram of a structure of still another STA provided in an embodiment of the present disclosure.

Specifically, as shown in FIG. 27, the calculating unit 1602 further includes a sending module 16023.

The obtaining module 16021 is further configured to obtain a first difference according to a first channel matrix.

The first difference is a frequency difference between a local crystal oscillator frequency and the crystal oscillator frequency of the AP.

The obtaining module 16021 is further configured to obtain a second difference according to a second channel matrix.

The second difference is a frequency difference between the local crystal oscillator frequency and the crystal oscillator frequency of the reference AP.

The sending module 16023 is configured to send the first difference and the second difference to the reference AP, so that the reference AP calculates the frequency difference between the crystal oscillator frequency of the AP and the crystal oscillator frequency of the reference AP according to the first difference and the second difference, and send the frequency difference between the crystal oscillator frequency of the AP and the crystal oscillator frequency of the reference AP to the AP.

According to the STA provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 28:
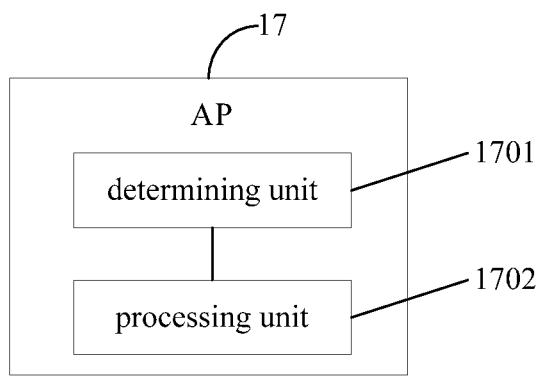
FIG. 28 is a schematic diagram of a structure of an AP provided in another embodiment of the present disclosure.

An embodiment of the present disclosure provides an AP17 applied to a cooperative transmission. As shown in FIG. 28, it includes a determining unit 1701 and a processing unit 1702.

The determining unit 1701 is configured to determine an obtained data category of data sent by an STA.

The processing unit 1702 is configured to store the data in a buffer in accordance with indication information if the data category of the data is joint transmission.

The buffer is read and data in the buffer is sent when a primary AP sends data.

The primary AP is any of APs having a control function.

Specifically, the buffer is an access category joint transmission AC_JT buffer, and the determining unit 1701 is specifically configured to:

determine the data category of the data according to a joint transmission indication JT_IDX carried in the data.

Figure 29:
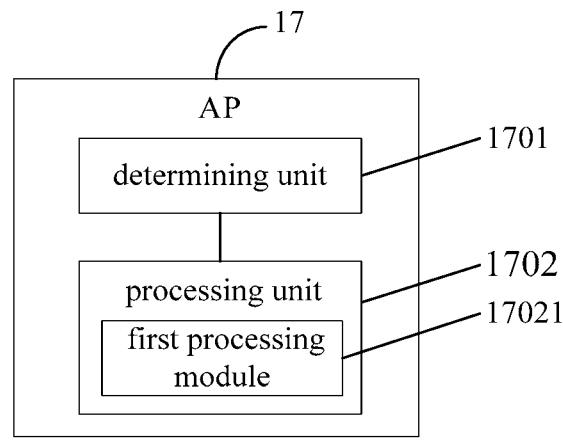
FIG. 29 is a schematic diagram of a structure of another AP provided in another embodiment of the present disclosure.

Further, the indication information is a data transmission order carried in the data. As shown in FIG. 29, the processing unit 1702 includes a first processing module 17021.

The first processing module 17021 is configured to store the data in the AC_JT buffer in accordance with the data transmission order carried in the data if the data category of the data is the joint transmission.

Figure 30:
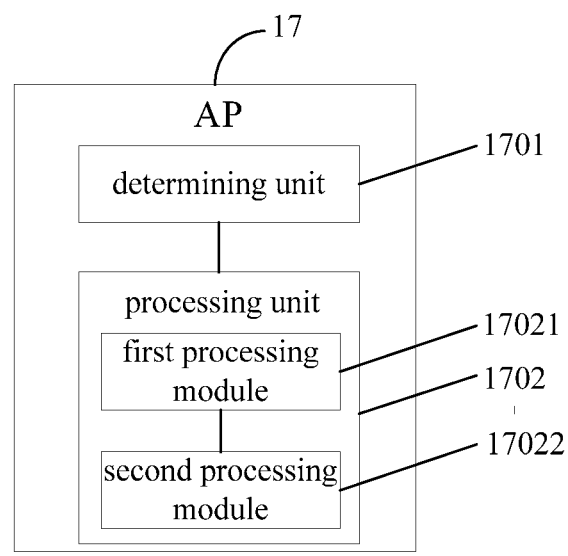
FIG. 30 is a schematic diagram of a structure of yet another AP provided in another embodiment of the present disclosure.

Further, the indication information is a data transmission order carried in an indication command. As shown in FIG. 30, the processing unit 1702 further includes a second processing module 17022.

The second processing module 17022 is configured to categorize the data as an AC_JT access category if the data category of the data is the joint transmission.

The second processing module 17022 is further configured to store the data in the AC_JT buffer in accordance with the data transmission order indicated in the indication command.

The indication command is carried in the data.

Figure 31:
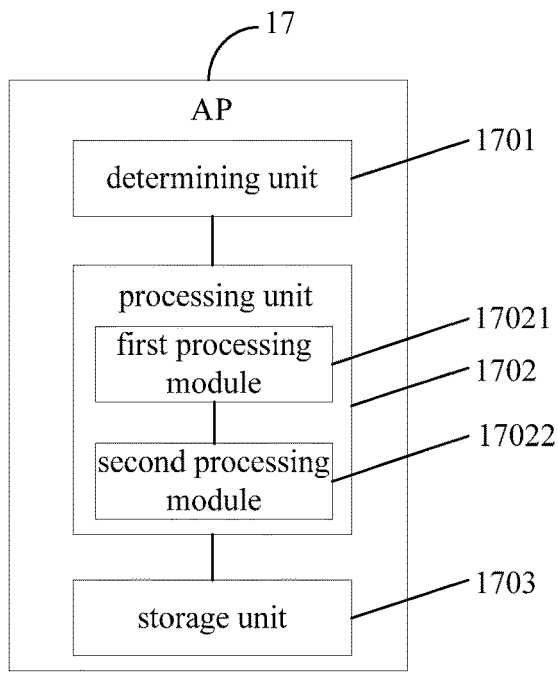
FIG. 31 is a schematic diagram of a structure of still another AP provided in another embodiment of the present disclosure.

Further, as shown in FIG. 31, the AP further includes a storage unit 1703.

The storage unit 1703 is configured to store the data in an access category queue corresponding to the data according to service category information carried in the data if the data category of the data is not the joint transmission.

Figure 32:
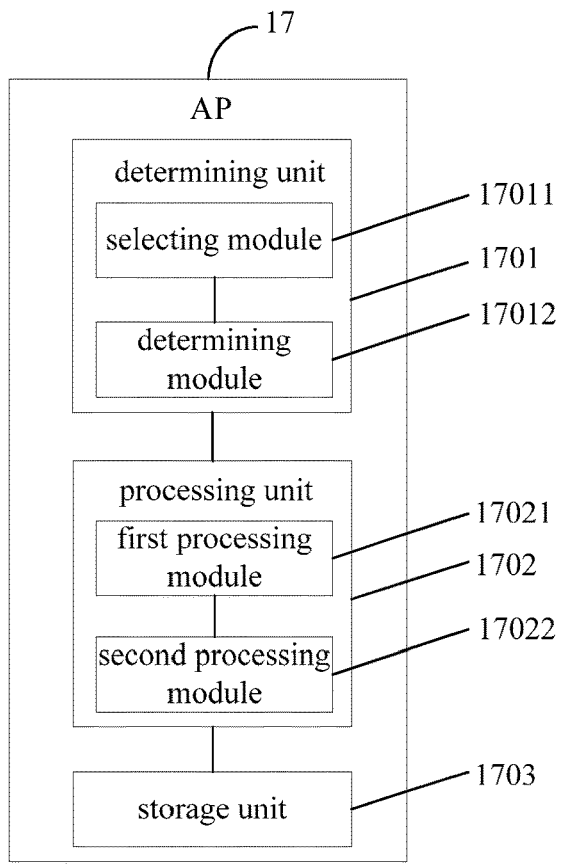
FIG. 32 is a schematic diagram of a structure of an AP provided in yet another embodiment of the present disclosure.

Specifically, the buffer is a joint transmission buffer JT Buffer. As shown in FIG. 32, the determining unit 1701 includes a selecting module 17011 and a determining module 17012.

The selecting module 17011 is configured to select data that needs to be jointly transmitted from a local access category buffer according to an obtained indication of the data that needs to be jointly transmitted sent by the STA.

The local access category includes an access category voice AC_VO, an access category video AC_VI, an access category best effort AC_BE or an access category background AC_BK.

The determining module 17012 is configured to determining the data category of the data as the joint transmission.

Figure 33:
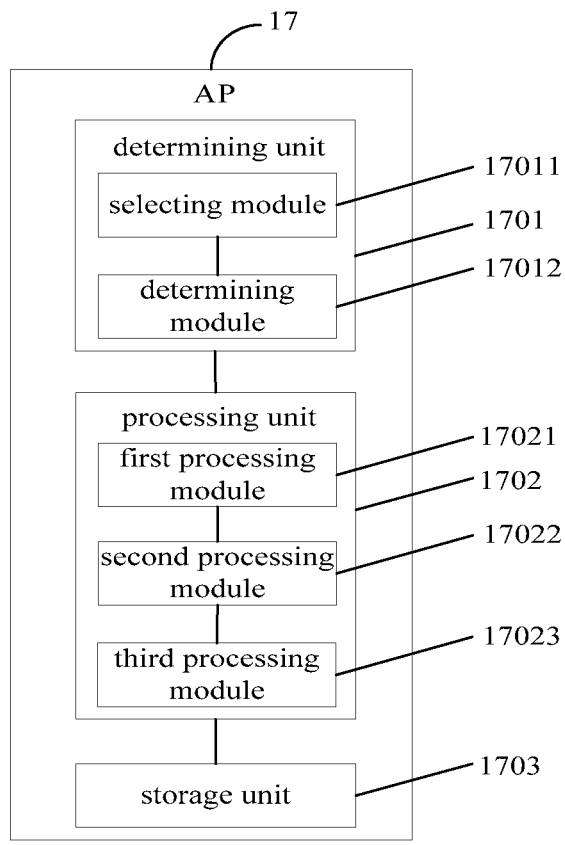
FIG. 33 is a schematic diagram of a structure of another AP provided in yet another embodiment of the present disclosure.

Further, the indication information is a data transmission order indicated in an instruction command prestored in the JT Buffer buffer. As shown in FIG. 33, the processing unit 1702 further includes a third processing module 17023.

The third processing module 17023 is configured to store the data in the JT Buffer buffer according to the data transmission order indicated in the instruction command prestored in the JT Buffer buffer if the data category of the data is the joint transmission.

The instruction command is stored in the JT Buffer buffer by the AP.

According to the AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 34:
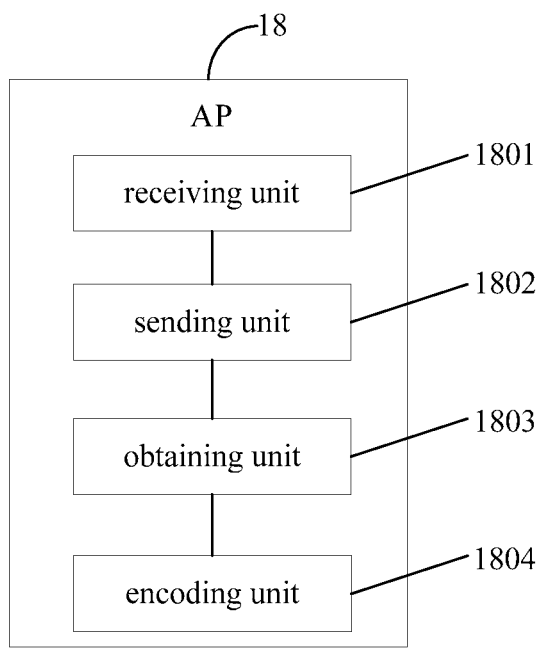
FIG. 34 is a schematic diagram of a structure of yet another AP provided in yet another embodiment of the present disclosure.

An embodiment of the present disclosure provides an AP18 applied to a cooperative transmission. As shown in FIG. 34, it includes a receiving unit 1801, a sending unit 1802, an obtaining unit 1803 and a coding unit 1804.

The receiving unit 1801 is configured to receive channel information sent by a station STA.

The sending unit 1802 is configured to send the channel information to a primary AP, so that the primary AP calculates a precoding matrix according to the channel information and a precoding rule and sends it to the AP through indication information.

The indication information carries the precoding matrix and a stream indication corresponding to each AP, and the stream indication is used for indicating a part of the precoding matrix used by each AP and a corresponding number of streams.

The receiving unit 1801 is further configured to receive the precoding matrix sent by the primary AP.

The obtaining unit 1802 is configured to obtain a sub-precoding matrix according to the precoding matrix.

The coding unit 1803 is configured to encode input data according to the sub-precoding matrix.

Further, the obtaining unit 1802 is specifically configured to:

calculate the sub-precoding matrix according to the obtained stream indication and precoding matrix.

The stream indication carries a submatrix of the sub-precoding matrix.

According to the AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 35:
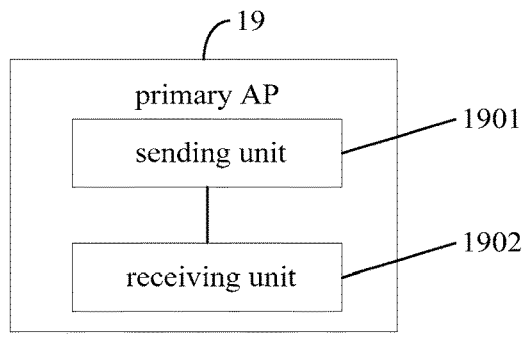
FIG. 35 is a schematic diagram of a structure of a primary AP provided in an embodiment of the present disclosure.

An embodiment of the present disclosure provides a primary AP19 applied to a cooperative transmission. As shown in FIG. 35, it includes a sending unit 1901 and a receiving unit 1902.

The sending unit 1901 is configured to send data to a station STA.

The data may indicate all APs and STAs participating in the cooperative transmission.

The receiving unit 1902 is configured to receive an acknowledgement ACK frame sent by the STA after the STA receives the data, so that any of the APs participating in the cooperative transmission determines its own data transmission time, so as to avoid occurrence of a conflict.

The ACK frame carries all the APs and STAs participating in the cooperative transmission.

Figure 36:
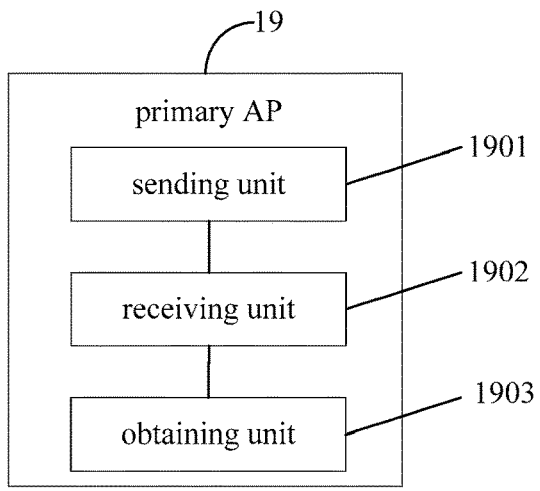
FIG. 36 is a schematic diagram of a structure of another primary AP provided in an embodiment of the present disclosure.

Further, as shown in FIG. 36, the primary AP19 further includes an obtaining unit 1903.

The obtaining unit 1903 is configured to obtain a response block acknowledgement BA for successful transmission sent by any of the STAs.

According to the primary AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 37:
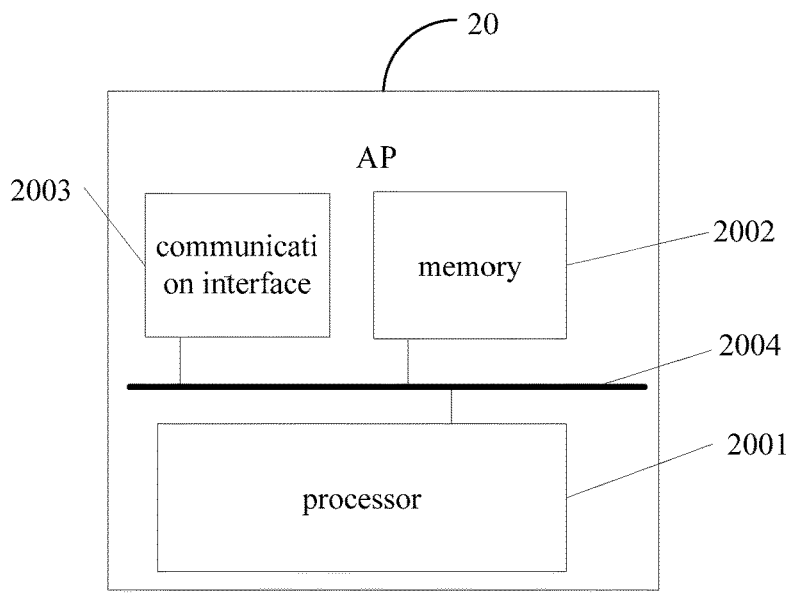
FIG. 37 is a schematic diagram of a structure of yet another AP provided in yet another embodiment of the present disclosure.

An embodiment of the present disclosure provides an AP20 applied to a cooperative transmission. As shown in FIG. 37, it includes at least one processor 2001, a memory 2002, a communication interface 2003 and a bus 2004. The at least one processor 2001, the memory 2002, the communication interface 2003 are connected and implement communication between each other through the bus 2004, and the memory 2001 is configured to store a program code.

The bus 2004 may be an industry standard architecture (Industry Standard Architecture, referred to as ISA) bus, a peripheral component interconnect (Peripheral Component Interconnect, referred to as PCI) bus or an extended industry standard architecture (Extended Industry Standard Architecture, referred to as EISA) bus or the like. The bus 2004 may be divided into an address bus, a data bus, a control bus and the like. For the convenience of representation, it is merely represented by a heavy line in FIG. 37, but it does not represent that there is only one bus or one type of bus.

The memory 2002 is configured to store a program code, and the program code includes an operating instruction. The memory 2002 probably includes a high speed RAM memory, or also probably includes a non-volatile memory (non-volatile memory), for example, at least one disk memory.

The processor 2001 is probably a central processing unit (Central Processing Unit, referred to as CPU), or an application specific integrated circuit (Application Specific Integrated Circuit, referred to as ASIC), or it is configured as one or multiple integrated circuits for implementing the embodiment of the present disclosure.

The communication interface 2003 is mainly configured to implement communication between devices in the present embodiment.

The processor 2001 is further configured to call the program code in the memory 2002 to perform the following operations:

obtaining a parameter value, wherein the parameter value is a frequency difference between a crystal oscillator frequency of the AP and a crystal oscillator frequency of a reference AP, or a delay difference of the AP with respect to the reference AP;

compensating a phase difference or a time difference according to the parameter value when both of the AP and the reference AP send data.

Specifically, the parameter value is a frequency difference between the crystal oscillator frequency of the AP and the crystal oscillator frequency of the reference AP, and the processor 2001 is further configured to perform the following operations:

receiving the crystal oscillator frequency of the reference AP sent by a primary AP, wherein, the primary AP is any of APs having a control function;

calculating the frequency difference between the crystal oscillator frequency of the AP and a reference crystal oscillator frequency of the reference AP according to the crystal oscillator frequency of the reference AP.

Optionally, the parameter value is a frequency difference between the crystal oscillator frequency of the AP and the crystal oscillator frequency of the reference AP, and the processor 2001 is further configured to perform the following operations:

sending the crystal oscillator frequency of the AP to the primary AP, so that the primary AP selects the crystal oscillator frequency of the reference AP and calculates the frequency difference between the crystal oscillator frequency of the AP and the crystal oscillator frequency of the reference AP according to the crystal oscillator frequency of the reference AP and the crystal oscillator frequency of the AP;

receiving the frequency difference between the crystal oscillator frequency of the AP and the crystal oscillator frequency of the reference AP sent by the primary AP.

Optionally, the parameter value is a frequency difference between the crystal oscillator frequency of the AP and the crystal oscillator frequency of the reference AP, and the processor 2001 is further configured to perform the following operations:

sending a first channel measured symbol to a station STA repeatedly at least twice, so that the STA calculates a first channel matrix with respect to the AP twice according to the first channel measured symbol and calculates the frequency difference between the crystal oscillator frequency of the AP and the crystal oscillator frequency of the reference AP according to the first channel matrix and a second channel matrix obtained;

Channel parameter matrixes of both the first channel matrix and the second channel matrix are unchanged, and the second channel matrix is a channel matrix with respect to the reference AP calculated by the STA according to a second channel measured symbol sent by the reference AP.

receiving the frequency difference between the crystal oscillator frequency of the AP and the crystal oscillator frequency of the reference AP sent by the station STA.

Optionally, the parameter value is a frequency difference between the crystal oscillator frequency of the AP and the crystal oscillator frequency of the reference AP, and the processor 2001 is further configured to perform the following operations:

sending a first channel measured symbol to a station STA repeatedly at least twice, so that the STA and the reference AP calculate a first channel matrix with respect to the AP twice according to the first channel measured symbol and calculate the frequency difference between the crystal oscillator frequency of the AP and the crystal oscillator frequency of the reference AP according to the first channel matrix and a second channel matrix, wherein, channel parameter matrixes of both the first channel matrix and the second channel matrix are unchanged, and the second channel matrix is a channel matrix with respect to the reference AP calculated by the STA according to a second channel measured symbol sent by the reference AP;

receiving the frequency difference between the crystal oscillator frequency of the AP and the crystal oscillator frequency of the reference AP sent by the reference AP.

Optionally, the parameter value is a delay difference of the AP with respect to the reference AP, and the processor 2001 is further configured to perform the following operations:

receiving a signal frame sent by an STA, wherein the signal frame carries a reference time;

calculating a sum of a sending delay and a propagation delay of the STA according to the reference time;

subtracting a sum of a sending delay and a propagation delay of the STA obtained by the reference AP from the calculated sum of the sending delay and the propagation delay of the STA to obtain a propagation delay difference and a processing delay difference for sending with respect to the reference AP.

The sum of the sending delay and the propagation delay of the STA obtained by the reference AP is calculated by the reference AP according to the reference time and sent to the AP.

According to the AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 38:
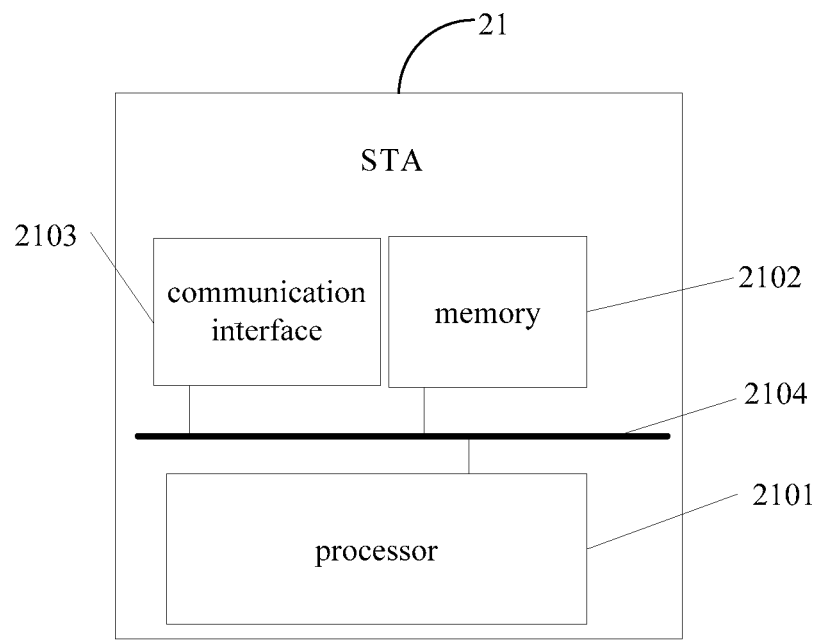
FIG. 38 is a schematic diagram of a structure of an STA provided in another embodiment of the present disclosure.

An embodiment of the present disclosure provides an STA21 applied to a cooperative transmission. As shown in FIG. 38, it includes at least one processor 2101, a memory 2102, a communication interface 2103 and a bus 2104. The at least one processor 2101, the memory 2102, the communication interface 2103 are connected and implement communication between each other through the bus 2104, and the memory 2101 is configured to store a program code.

The bus 2104 may be an industry standard architecture (Industry Standard Architecture, referred to as ISA) bus, a peripheral component interconnect (Peripheral Component Interconnect, referred to as PCI) bus or an extended industry standard architecture (Extended Industry Standard Architecture, referred to as EISA) bus or the like. The bus 2104 may be divided into an address bus, a data bus, a control bus and the like. For the convenience of representation, it is merely represented by a heavy line in FIG. 38, but it does not indicate that there is only one bus or one type of bus.

The memory 2102 is configured to store a program code, and the program code includes an operating instruction. The memory 2102 probably includes a high speed RAM memory, or also probably includes a non-volatile memory (non-volatile memory), for example, at least one disk memory.

The processor 2101 is probably a central processing unit (Central Processing Unit, referred to as CPU), or an application specific integrated circuit (Application Specific Integrated Circuit, referred to as ASIC), or it is configured as one or multiple integrated circuits for implementing the embodiment of the present disclosure.

The communication interface 2103 is mainly configured to implement communication between devices in the present embodiment.

The processor 2101 is further configured to call the program code in the memory 2102 to perform the following operations:

receiving a first channel measured symbol sent by an AP repeatedly at least twice;

receiving a second channel measured symbol sent by a reference AP repeatedly at least twice;

calculating a first channel matrix with respect to the AP according to the first channel measured symbol;

calculating a second channel matrix with respect to the reference AP according to the second channel measured symbol;

calculating a frequency difference between a crystal oscillator frequency of the AP and a crystal oscillator frequency of the reference AP according to the first channel matrix and the second channel matrix.

Specifically, the processor 2101 is further configured to obtain a first difference according to the first channel matrix.

The first difference is a frequency difference between a local crystal oscillator frequency and the crystal oscillator frequency of the AP.

The processor 2101 is further configured to obtain a second difference according to the second channel matrix.

The second difference is a frequency difference between the local crystal oscillator frequency and the crystal oscillator frequency of the reference AP.

The processor 2101 is further configured to calculate the frequency difference between the crystal oscillator frequency of the AP and the crystal oscillator frequency of the reference AP according to the first difference and the second difference.

Further, the processor 2101 is further configured to send the frequency difference between the crystal oscillator frequency of the AP and the crystal oscillator frequency of the reference AP to the AP.

Optionally, the processor 2101 is further configured to perform the following operations:

obtaining a first difference according to the first channel matrix, wherein, the first difference is a frequency difference between a local crystal oscillator frequency and the crystal oscillator frequency of the AP;

obtaining a second difference according to the second channel matrix, wherein, the second difference is a frequency difference between the local crystal oscillator frequency and the crystal oscillator frequency of the reference AP;

sending the first difference and the second difference to the reference AP, so that the reference AP calculates the frequency difference between the crystal oscillator frequency of the AP and the crystal oscillator frequency of the reference AP according to the first difference and the second difference, and sends the frequency difference between the crystal oscillator frequency of the AP and the crystal oscillator frequency of the reference AP to the AP.

According to the STA provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 39:
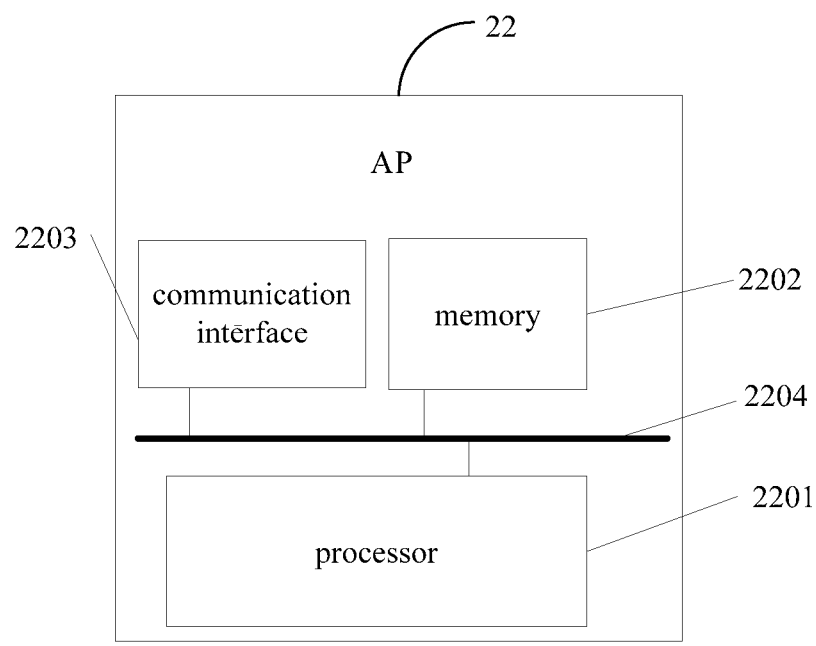
FIG. 39 is a schematic diagram of a structure of an AP provided in yet another embodiment of the present disclosure.

An embodiment of the present disclosure provides an AP22 applied to a cooperative transmission. As shown in FIG. 39, it includes at least one processor 2201, a memory 2202, a communication interface 2203 and a bus 2204. The at least one processor 2201, the memory 2202, the communication interface 2203 are connected and implement communication between each other through the bus 2204, and the memory 2201 is configured to store a program code.

The bus 2204 may be an industry standard architecture (Industry Standard Architecture, referred to as ISA) bus, a peripheral component interconnect (Peripheral Component Interconnect, referred to as PCI) bus or an extended industry standard architecture (Extended Industry Standard Architecture, referred to as EISA) bus or the like. The bus 2204 may be divided into an address bus, a data bus, a control bus and the like. For the convenience of representation, it is merely represented by a heavy line in FIG. 39, but it does not indicate that there is only one bus or one type of bus.

The memory 2202 is configured to store a program code, and the program code includes an operating instruction. The memory 2202 probably includes a high speed RAM memory, or also probably includes a non-volatile memory (non-volatile memory), for example, at least one disk memory.

The processor 2201 is probably a central processing unit (Central Processing Unit, referred to as CPU), or an application specific integrated circuit (Application Specific Integrated Circuit, referred to as ASIC), or it is configured as one or multiple integrated circuits for implementing the embodiment of the present disclosure.

The communication interface 2203 is mainly configured to implement communication between devices in the present embodiment.

The processor 2201 is configured to call the program code in the memory 2202 to perform the following operations:

determining an obtained data category of data sent by an STA;

storing the data in a buffer in accordance with indication information if the data category of the data is joint transmission;

reading the buffer and sending data in the buffer when a primary AP sends data.

The primary AP is any of APs having a control function.

Specifically, the buffer is an access category joint transmission AC_JT buffer.

The processor 2201 is further configured to determine the data category of the data according to a joint transmission_indication JT_IDX carried in the data.

Further, the indication information is a data transmission order carried in the data.

The processor 2201 is further configured to store the data in the AC_JT buffer in accordance with the data transmission order carried in the data if the data category of the data is the joint transmission.

Optionally, the indication information is a data transmission order indicated in an indication command, wherein the processor 2201 is further configured to perform the following operations:

categorizing the data as an AC_JT access category if the data category of the data is the joint transmission;

storing the data in the AC_JT buffer in accordance with the data transmission order indicated in the indication command.

The instruction command is carried in the data.

Further, the processor 2201 is further configured to store the data in an access category queue corresponding to the data according to service category information carried in the data if the data category of the data is not used for the joint transmission.

Optionally, the buffer is a joint transmission buffer JT Buffer, and the processor 2201 is further configured to perform the following operations:

selecting data that needs to be jointly transmitted from a local access category buffer according to an obtained indication of the data that needs to be jointly transmitted and sent by the STA, wherein, the local access category includes an access category voice AC_VO, an access category video AC_VI, an access category best effort AC_BE or an access category background AC_BK;

determining the data category of the data as the joint transmission.

Further, the indication information is a data transmission order indicated in an instruction command prestored in the JT Buffer buffer.

The processor 2201 is further configured to store the data in the JT Buffer buffer according to the data transmission order indicated in the instruction command prestored in the JT Buffer buffer if the data category of the data is the joint transmission.

The instruction command is stored in the JT Buffer buffer by the AP.

According to the AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 40:
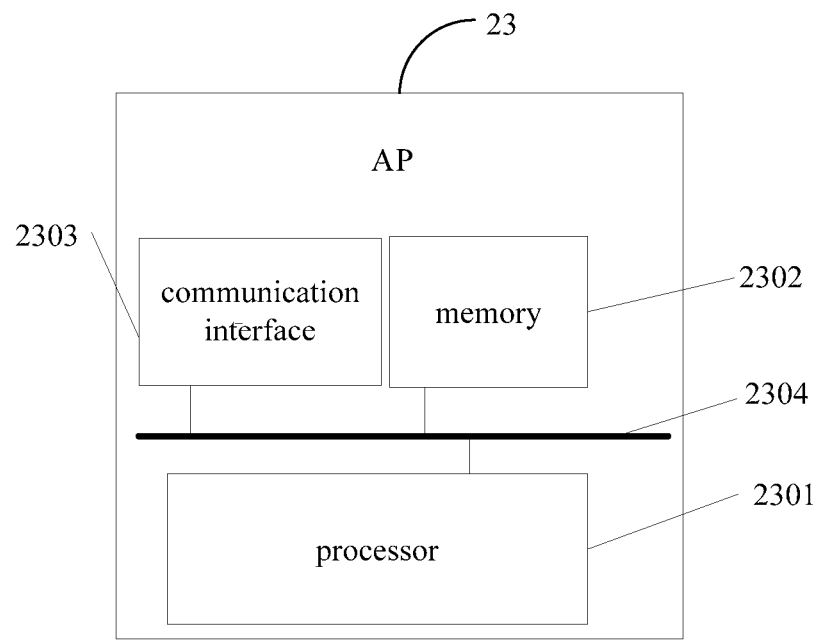
FIG. 40 is a schematic diagram of a structure of another AP provided in yet another embodiment of the present disclosure.

An embodiment of the present disclosure provides an AP23 applied to a cooperative transmission. As shown in FIG. 40, it includes at least one processor 2301, a memory 2302, a communication interface 2303 and a bus 2304. The at least one processor 2301, the memory 2302, the communication interface 2303 are connected and implement communication between each other through the bus 2304, and the memory 2301 is configured to store a program code.

The bus 2304 may be an industry standard architecture (Industry Standard Architecture, referred to as ISA) bus, a peripheral component interconnect (Peripheral Component Interconnect, referred to as PCI) bus or an extended industry standard architecture (Extended Industry Standard Architecture, referred to as EISA) bus or the like. The bus 2304 may be divided into an address bus, a data bus, a control bus and the like. For the convenience of representation, it is merely represented by a heavy line in FIG. 40, but it does not indicate that there is only one bus or one type of bus.

The memory 2302 is configured to store a program code, and the program code includes an operating instruction The memory 2302 probably includes a high speed RAM memory, or also probably includes a non-volatile memory (non-volatile memory), for example, at least one disk memory.

The processor 2301 is probably a central processing unit (Central Processing Unit, referred to as CPU), or an application specific integrated circuit (Application Specific Integrated Circuit, referred to as ASIC), or it is configured as one or multiple integrated circuits for implementing the embodiment of the present disclosure.

The communication interface 2303 is mainly configured to implement communication between devices in the present embodiment.

The processor 2301 is further configured to call the program code in the memory 2302 to perform the following operations:

receiving, by an AP, channel information sent by an STA;

sending the channel information to a primary AP, so that the primary AP calculates a precoding matrix according to the channel information and a precoding rule and sends it to the AP through indication information, wherein, the indication information carries the precoding matrix and a stream indication corresponding to each AP, and the stream indication is used for indicating a part of the precoding matrix used by each AP and a corresponding number of streams;

receiving the precoding matrix sent by the primary AP;

obtaining a sub-precoding matrix according to the precoding matrix;

encoding input data according to the sub-precoding matrix.

Further, the processor 2301 is further configured to calculate the sub-precoding matrix according to the obtained stream indication and precoding matrix.

The stream indication carries a submatrix of the sub-precoding matrix.

According to the AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Figure 41:
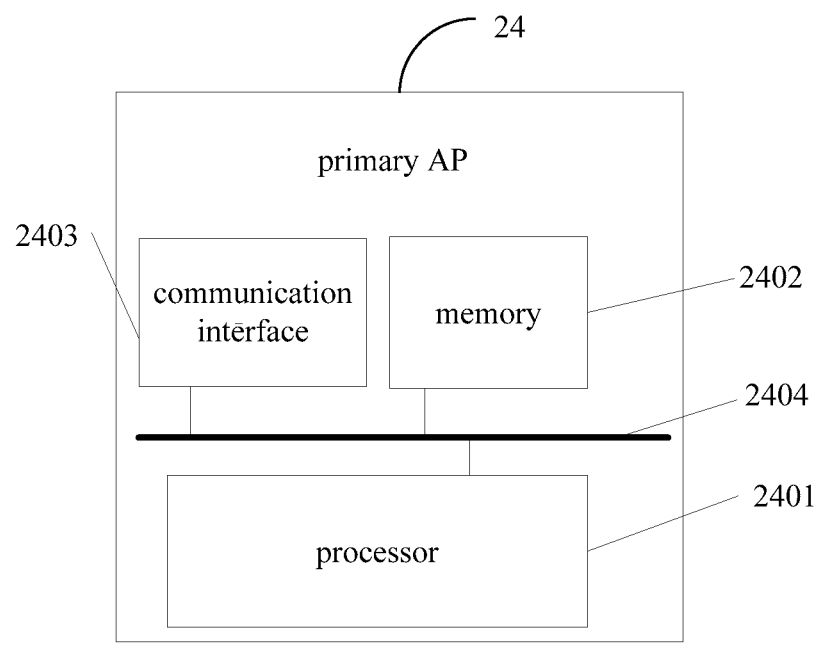
FIG. 41 is a schematic diagram of a structure of yet another primary AP provided in an embodiment of the present disclosure.

An embodiment of the present disclosure provides a primary AP24 applied to a cooperative transmission. As shown in FIG. 41, it includes at least one processor 2401, a memory 2402, a communication interface 2403 and a bus 2404. The at least one processor 2401, the memory 2402, the communication interface 2403 are connected and implement communication between each other through the bus 2404, and the memory 2401 is configured to store a program code.

The bus 2404 may be an industry standard architecture (Industry Standard Architecture, referred to as ISA) bus, a peripheral component interconnect (Peripheral Component Interconnect, referred to as PCI) bus or an extended industry standard architecture (Extended Industry Standard Architecture, referred to as EISA) bus or the like. The bus 2404 may be divided into an address bus, a data bus, a control bus and the like. For the convenience of representation, it is merely represented by a heavy line in FIG. 41, but it does not indicate that there is only one bus or one type of bus.

The memory 2402 is configured to store a program code, and the program code includes an operating instruction. The memory 2402 probably includes a high speed RAM memory, or also probably includes a non-volatile memory (non-volatile memory), for example, at least one disk memory.

The processor 2401 is probably a central processing unit (Central Processing Unit, referred to as CPU), or an application specific integrated circuit (Application Specific Integrated Circuit, referred to as ASIC), or it is configured as one or multiple integrated circuits for implementing the embodiment of the present disclosure.

The communication interface 2403 is mainly configured to implement communication between devices in the present embodiment.

The processor 2401 is further configured to call the program code in the memory 2402 to perform the following operations:

sending data to a station STA, wherein, the data may indicate all APs and STAs participating in the cooperative transmission;

receiving an acknowledgement ACK frame sent by the STA after the STA receives the data, so that any of the APs participating in the cooperative transmission determines its own data transmission time, so as to avoid occurrence of a conflict.

The ACK frame carries all the APs and STAs participating in the cooperative transmission.

Further, the processor 2801 is further configured to perform the following operations:

obtaining a response block acknowledgement BA for successful transmission sent by any of the STAs.

According to the primary AP provided in the embodiment of the present disclosure, in an application of cooperative transmission in aspects of synchronization, sharing of information such as data and the like, obtaining of channel information and data transmission, a technical solution in which a cooperative transmission solution is applied to synchronization, sharing of information such as data, obtaining of channel information and data method in an actual network is provided, which reduces overhead and improves work efficiency. Meanwhile, application scenarios may also be extended.

Those of ordinary skill in the art may clearly understand that, for convenience and simplicity of description, division of the foregoing functional modules is only taken as an example for illustration. In actual application, the foregoing function is allocated to be completed by different functional modules according to requirement, i.e., an internal structure of a device is divided into different functional modules to complete all or a part of function of the foregoing descriptions. The specific working processes of the system, device and units described above may refer to corresponding processes in the foregoing method embodiments, and will not be repeated redundantly herein.

In the several embodiments provided in the present application, it should be understood that, the disclosed system, device and method may be implemented in other manners. For example, the device embodiments described above are merely exemplary, e.g., the division of the modules or units is only a logic function division, other division manners may exist in practical implementation, for example, multiple units or components may be combined or integrated to another system, or some features may be omitted or not implemented. In addition, the displayed or discussed mutual coupling or direct coupling or communication connection may be indirect coupling or communication connection through some interfaces, devices or units, and may be in electrical, mechanical or other forms.

The units described as separate components may be separated physically or not, components displayed as units may be physical units or not, namely, may be located in one place, or may also be distributed on multiple network units. A part of or all of the units may be selected to achieve the purposes of the solutions in the present embodiments according to actual demands.

In addition, the functional units in the embodiments of the present application may be integrated in a processing unit, or the units singly exist physically, or two or more units are integrated in one unit. The above-mentioned integrated unit may be implemented in the form of hardware and may also be implemented in the form of a software functional unit.

If the integrated unit is implemented in the form of the software functional unit and is sold or used as an independent product, it may be stored in a computer readable storage medium. Based on this understanding, the technical solutions of the present application substantially, or the part contributing to the prior art, or all or a part of the technical solutions may be implemented in the form of a software product, the computer software product is stored in a storage medium, and includes a plurality of instructions enabling a computer device (may be a personnel computer, a server, or a network device, etc.) or a processor (processor) to execute all or a part of the steps of the methods in the embodiments of the present application.

Those of ordinary skill in the art may understand that all or a part of the steps for achieving the above-mentioned method embodiments may be implemented with a program instructing corresponding hardware. The foregoing program may be stored in a computer readable storage medium. When being executed, the program may execute the steps of the above-mentioned method embodiments; the foregoing storage medium includes a variety of media capable of storing program codes, such as a USB disk, a mobile hard disk, a read-only memory (Read-Only Memory, referred to as ROM), a random access memory (Random Access Memory, referred to as RAM), a magnetic disk, an optical disk or the like.

The foregoing descriptions and embodiments are merely used for illustrating the technical solutions of the present application, rather than limiting them; although the present application has been described in detail with reference to the foregoing embodiments, those of ordinary skill in the art should understand that they could still make modifications to the technical solutions recorded in the foregoing embodiments or make equivalent substitutions to a part of technical features therein; and these modifications or substitutions do not make the essence of the corresponding technical solutions depart from the spirit and scope of the technical solutions of the embodiments of the present application. Accordingly, the protection scope of the claims should prevail over the protection scope of the present disclosure.

What is claimed is:

1. A transmission method applied to a cooperative transmission, wherein the method comprises:

sending, by an access point (AP), a first channel measured symbol to a station (STA) at least twice, to enable the STA to calculate a first channel matrix with respect to the AP twice according to the first channel measured symbol and to calculate a frequency difference between a crystal oscillator frequency of the AP and a crystal oscillator frequency of a reference AP according to the first channel matrix and a second channel matrix obtained, wherein channel parameter matrixes of both the first channel matrix and the second channel matrix are unchanged, and the second channel matrix is a channel matrix with respect to the reference AP calculated by the STA according to a second channel measured symbol sent by the reference AP;

receiving the frequency difference between the crystal oscillator frequency of the AP and the crystal oscillator frequency of the reference AP sent by the STA; and compensating, by the AP, one of a phase difference and a time difference according to the parameter value when both of the AP and the reference AP send data.

2. A transmission method applied to a cooperative transmission, wherein the method comprises:

sending, by an access point (AP), a first channel measured symbol to a station (STA) at least twice, to enable the STA and the reference AP to calculate a first channel matrix with respect to the AP twice according to the first channel measured symbol and to calculate a frequency difference between a crystal oscillator frequency of the AP and a crystal oscillator frequency of a reference AP according to the first channel matrix and a second channel matrix, wherein channel parameter matrixes of both the first channel matrix and the second channel matrix are unchanged, and the second channel matrix is a channel matrix with respect to the reference AP calculated by the STA according to a second channel measured symbol sent by the reference AP;

receiving the frequency difference between the crystal oscillator frequency of the AP and the crystal oscillator frequency of the reference AP sent by the reference AP; and compensating, by the AP, one of a phase difference and a time difference according to the parameter value when both of the AP and the reference AP send data.

3. A transmission method applied to a cooperative transmission, wherein the method comprises:

receiving, by an access point (AP), a signal frame sent by a station (STA), wherein the signal frame carries a reference time;

calculating a sum of a sending delay and a propagation delay of the STA according to the reference time;

subtracting a sum of a sending delay and a propagation delay of the STA obtained by the reference AP from the calculated sum of the sending delay and the propagation delay of the STA to obtain a propagation delay difference and a processing delay difference for sending with respect to a reference AP, wherein the sum of the sending delay and the propagation delay of the STA obtained by the reference AP is calculated by the reference AP according to the reference time and sent to the AP; and compensating, by the AP, one of a phase difference and a time difference according to the parameter value when both of the AP and the reference AP send data.

4. An access point (AP), wherein the AP comprises:

at least one processor, a memory, a communication interface and a bus, wherein the at least one processor, the memory, and the communication interface are connected and implement communication between each other through the bus, and the memory is configured to store a program code, wherein, the processor is configured to execute the program code in the memory to:

send a first channel measured symbol to a station (STA) at least twice, to enable the STA to calculate a first channel matrix with respect to the AP twice according to the first channel measured symbol and to calculate a frequency difference between a crystal oscillator frequency of the AP and a crystal oscillator frequency of a reference AP according to the first channel matrix and a second channel matrix obtained, wherein channel parameter matrixes of both the first channel matrix and the second channel matrix are unchanged, and the second channel matrix is a channel matrix with respect to the reference AP calculated by the STA according to a second channel measured symbol sent by the reference AP;

receive the frequency difference between the crystal oscillator frequency of the AP and the crystal oscillator frequency of the reference AP sent by the STA; and compensate a phase difference or a time difference according to the parameter value when both of the AP and the reference AP send data.

5. An access point (AP), wherein the AP comprises:

at least one processor, a memory, a communication interface and a bus, wherein the at least one processor, the memory, and the communication interface are connected and implement communication between each other through the bus, and the memory is configured to store a program code, wherein, the processor is configured to execute the program code in the memory to:

send a first channel measured symbol to a station (STA) at least twice, to enable the STA and the reference AP to calculate a first channel matrix with respect to the AP twice according to the first channel measured symbol and to calculate a frequency difference between a crystal oscillator frequency of the AP and a crystal oscillator frequency of a reference AP according to the first channel matrix and a second channel matrix, wherein channel parameter matrixes of both the first channel matrix and the second channel matrix are unchanged, and the second channel matrix is a channel matrix with respect to the reference AP calculated by the STA according to a second channel measured symbol sent by the reference AP;

receive the frequency difference between the crystal oscillator frequency of the AP and the crystal oscillator frequency of the reference AP sent by the reference AP; and compensate a phase difference or a time difference according to the parameter value when both of the AP and the reference AP send data.

6. An access point (AP), wherein the AP comprises:

at least one processor, a memory, a communication interface and a bus, wherein the at least one processor, the memory, and the communication interface are connected and implement communication between each other through the bus, and the memory is configured to store a program code, wherein, the processor is configured to execute the program code in the memory to:

receive a signal frame sent by a station (STA), wherein the signal frame carries a reference time;

calculate a sum of a sending delay and a propagation delay of the STA according to the reference time;

subtract a sum of a sending delay and a propagation delay of the STA obtained by the reference AP from the calculated sum of the sending delay and the propagation delay of the STA to obtain a propagation delay difference AP and a processing delay difference for sending with respect to a reference AP, wherein the sum of the sending delay and the propagation delay of the STA obtained by the reference AP is calculated by the reference AP according to the reference time and sent to the AP; and compensate a phase difference or a time difference according to the parameter value when both of the AP and the reference AP send data.

* * * * *